United States Patent [19]
Tamaru et al.

[11] Patent Number: 5,784,515
[45] Date of Patent: Jul. 21, 1998

[54] OPTICAL FIBER CROSS CONNECTION APPARATUS AND METHOD

[75] Inventors: Naoyuki Tamaru, Musashino; Yasuhide Nishida, Kodaira; Tsuneo Kanai, Tokorozawa; Kazumasa Kaneko, Fuchu; Joji Yamaguchi, Tokyo; Tetsufumi Shoji, Kadaira, all of Japan

[73] Assignee: Nippon Telegraph and Telephone Corporation, Tokyo, Japan

[21] Appl. No.: 589,424

[22] Filed: Jan. 22, 1996

[30] Foreign Application Priority Data

Jan. 23, 1995 [JP] Japan .................... 7-008131

[51] Int. Cl.$^6$ .................................................. G02B 6/00
[52] U.S. Cl. ........................... 385/134; 385/135; 385/139
[58] Field of Search .................................. 385/134–139

[56] References Cited

U.S. PATENT DOCUMENTS 5,511,144  4/1996  Hawkins et al. ..................... 385/134

FOREIGN PATENT DOCUMENTS

| 0494 768 A2 | 7/1992 | European Pat. Off. . |
| 6-181584 | 6/1994 | Japan . |
| 6181584 | 6/1994 | Japan . |
| 7134257 | 5/1995 | Japan . |
| 7-244225 | 9/1995 | Japan . |

OTHER PUBLICATIONS

Y. Nishida et al., "Main Distributing Frame Using a Fiber-handling Method in Optical Access Networks," OFC '95 Technical Disgest, vol. 8, pp. 57–58 (Feb. 26–Mar. 3, 1995).

J. Yamaguchi et al., "A 100×100 optical Fiber Cross–Connect System," Proceedings of 44th International Wire and Cable Symposium, Philadelphia, PA(Nov. 13–16, 1995).

Tamaru, Naoyuki et al., "Automated Optical Main–Distributing–Frame by Fiber Handling Robot", NTT Interdisciplinary Research Laboratories, B–838,194 no month.

Nishida, Yasuhide et al., "Main distributing frame using a fiber–handling method in optical access networks", OFC' 95 Technical Digest, pp. 57–1995 no month.

Yamaguchi, Joji et al., "A 100 ×100 Optical Fiber Cross–Connect System", NTT Interdisciplinary Research laboratories, pp. 14–16, 1995 no month.

*Primary Examiner*—Phan T. H. Palmer
*Attorney, Agent, or Firm*—Finnegan, Henderson, Farabow, Garrett & Dunner, L.L.P.

[57] ABSTRACT

An optical fiber cross connection apparatus is provided for connecting and disconnecting input optical fibers to desired output optical fibers, each of the input optical fibers being equipped with a plug on a tip thereof. The optical fiber cross connection apparatus comprises an arrangement board installed approximately vertically, which has a plurality of alignment holes for releasably holding the plugs and for passing the input optical fibers therethrough, a connection board installed approximately vertically, on which a plurality of connection adapters are positioned to which the output optical fibers are connected and to which the plugs of the input optical fibers are connectable, a handling mechanism for drawing the input optical fibers from the arrangement board so that the input optical fibers are drawn through the alignment holes and for connecting the plugs thereof to desired connection adapters, a roll-up mechanism for paying out the input optical fibers when the fibers are drawn through the alignment holes by the handling mechanism, and traveling mechanisms for moving the handling mechanism and the roll-up mechanism to a desired position with respect to the connection board and the arrangement board.

14 Claims, 19 Drawing Sheets

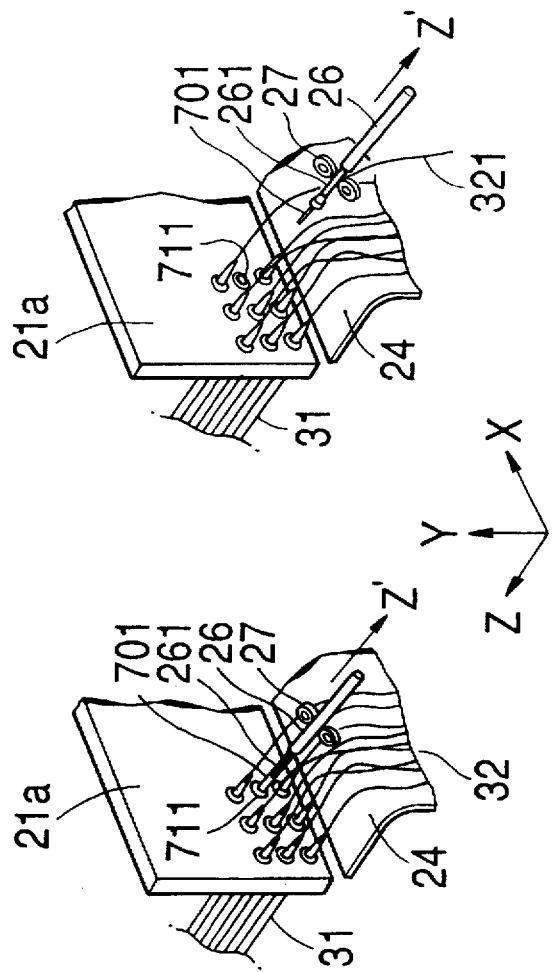

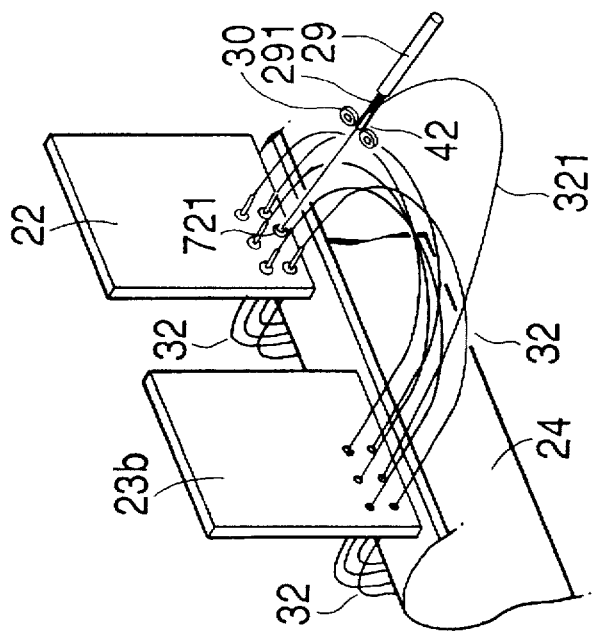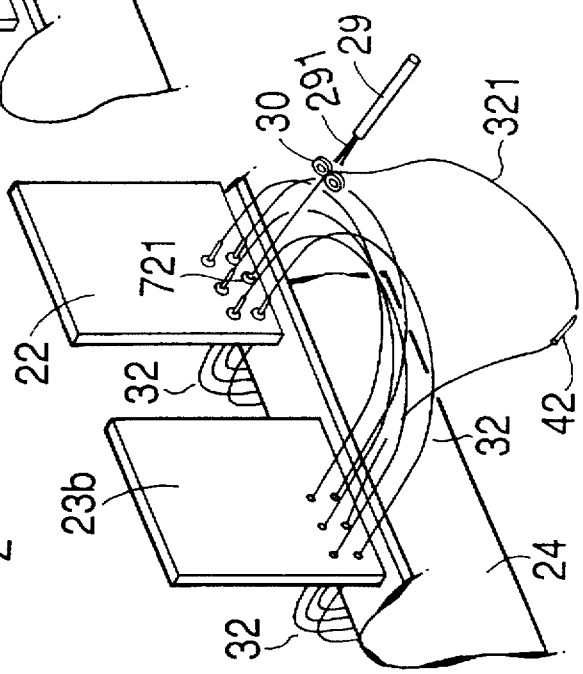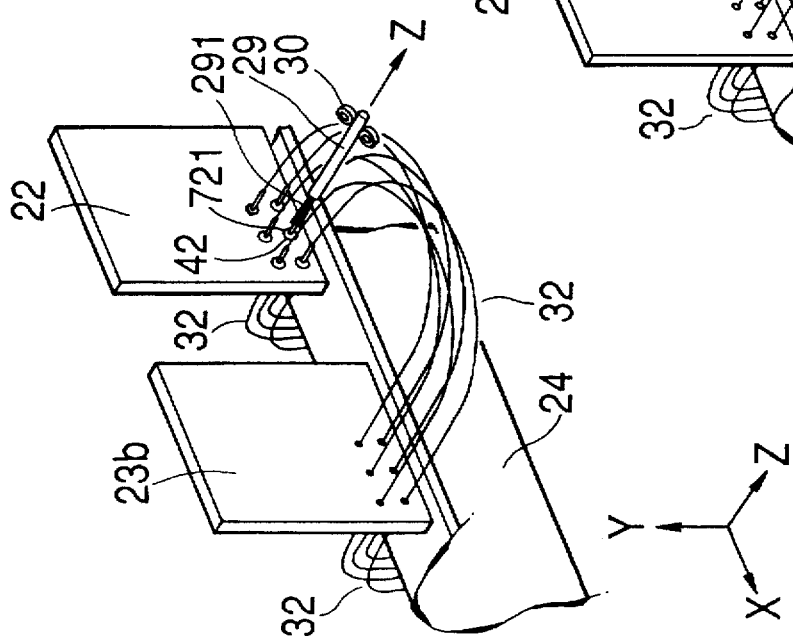

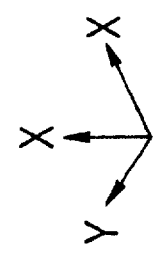
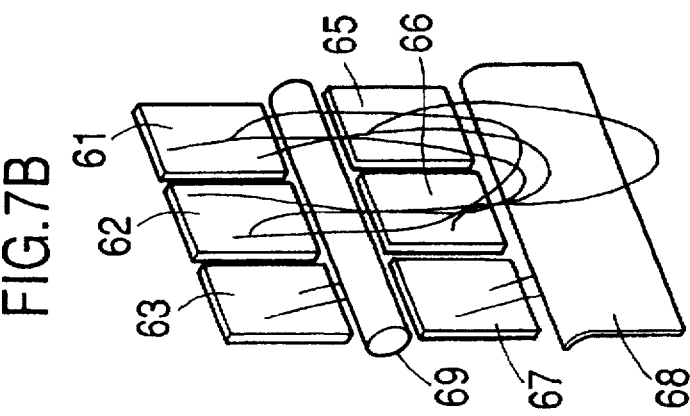
FIG.7B
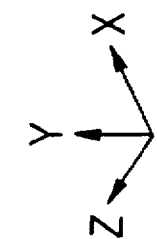
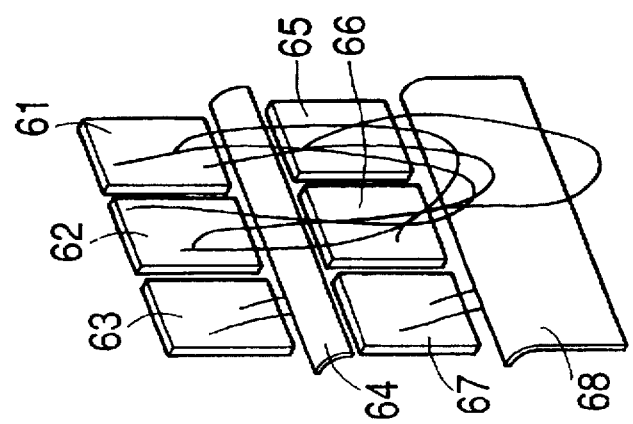
FIG.7A
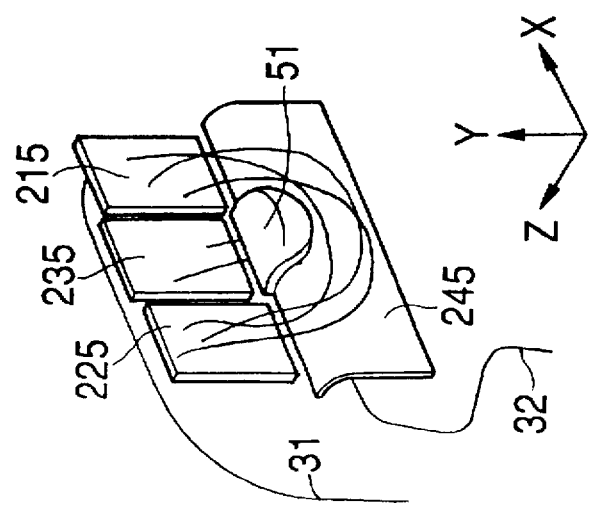
FIG.5

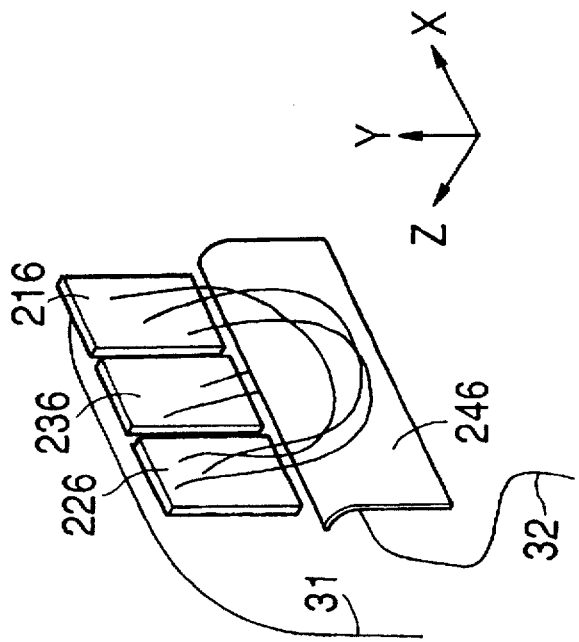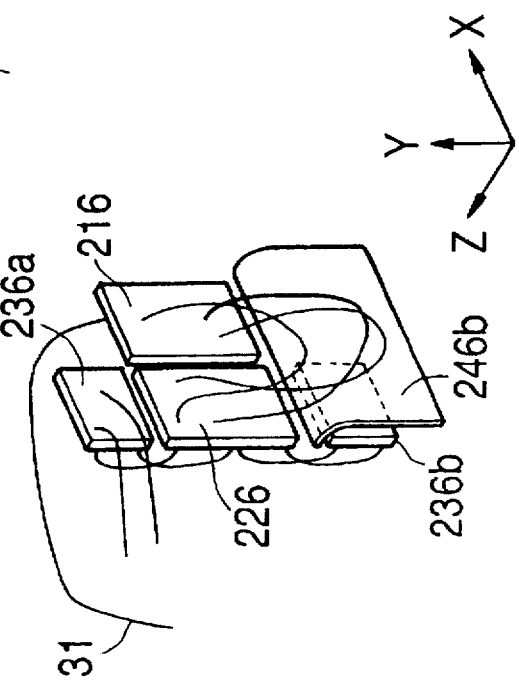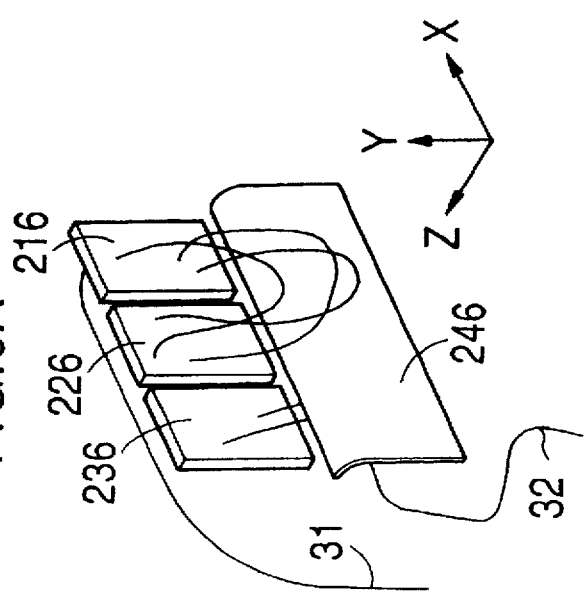

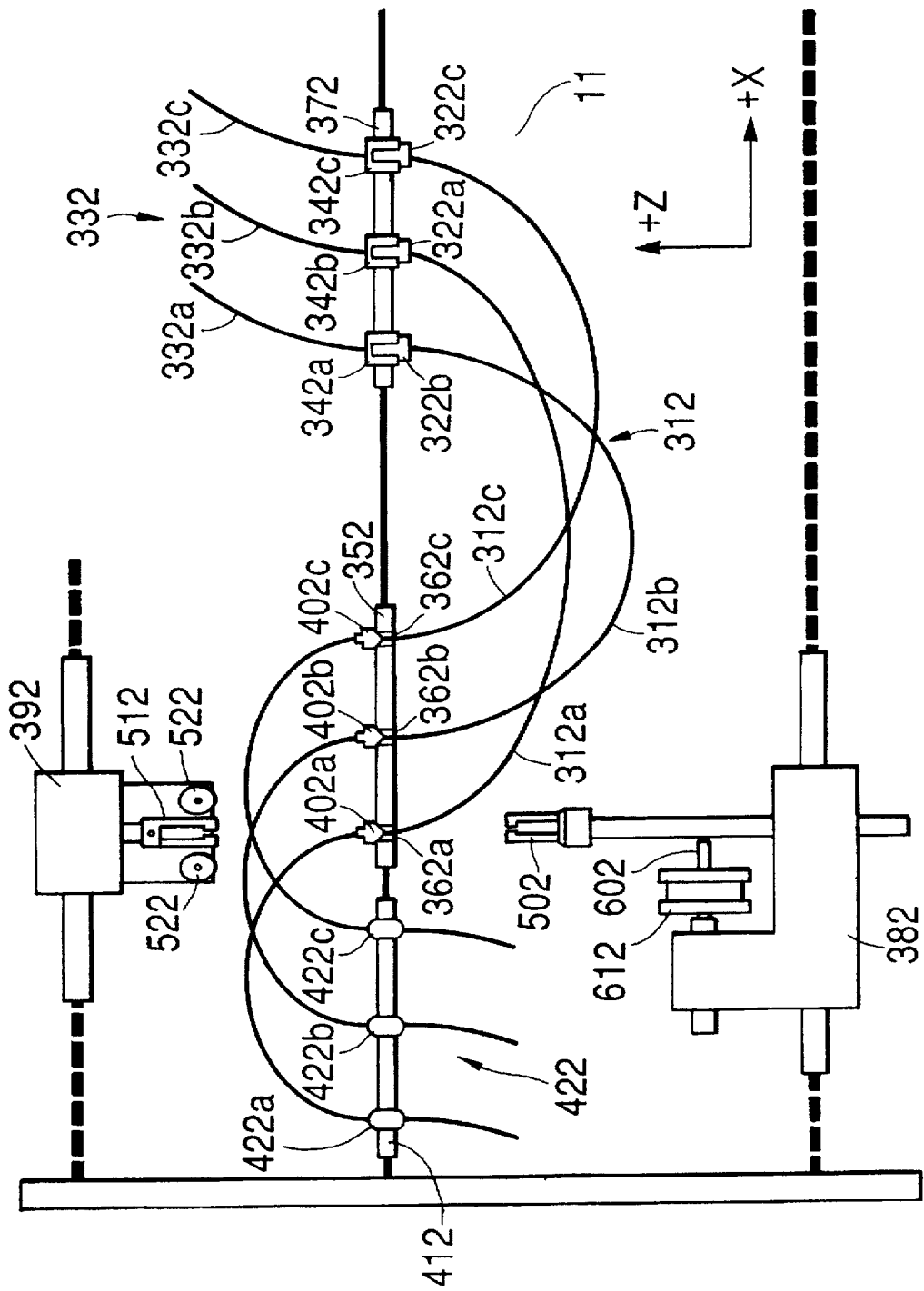

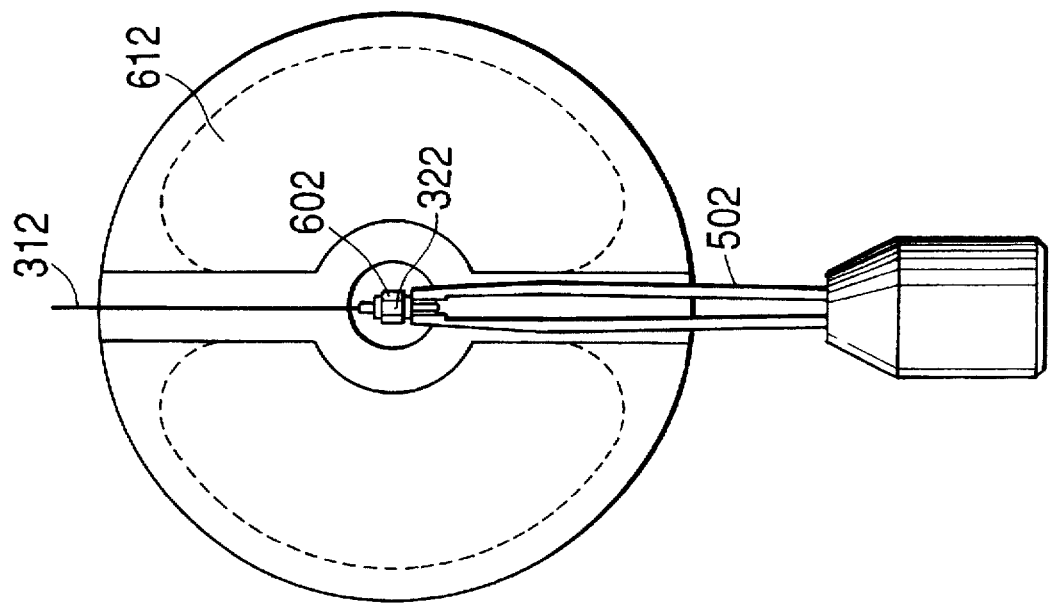
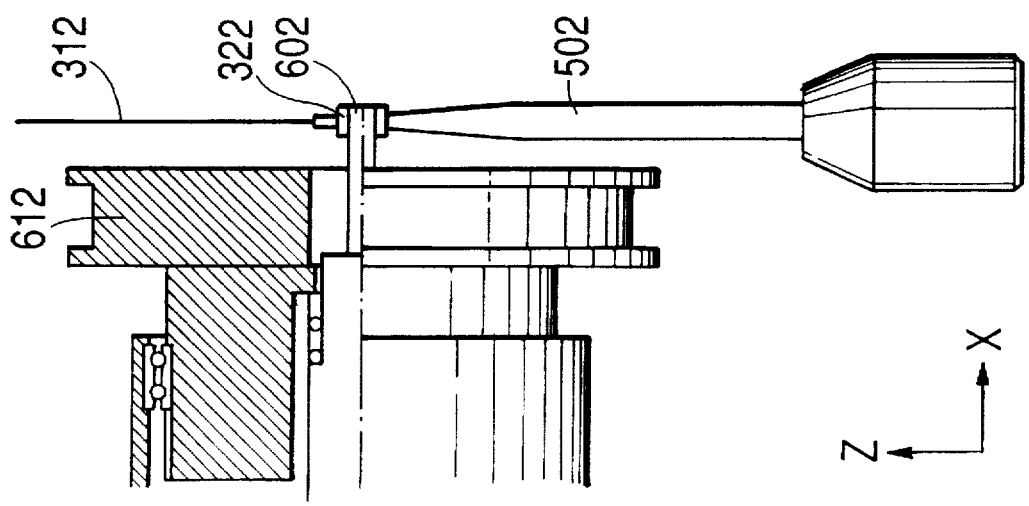

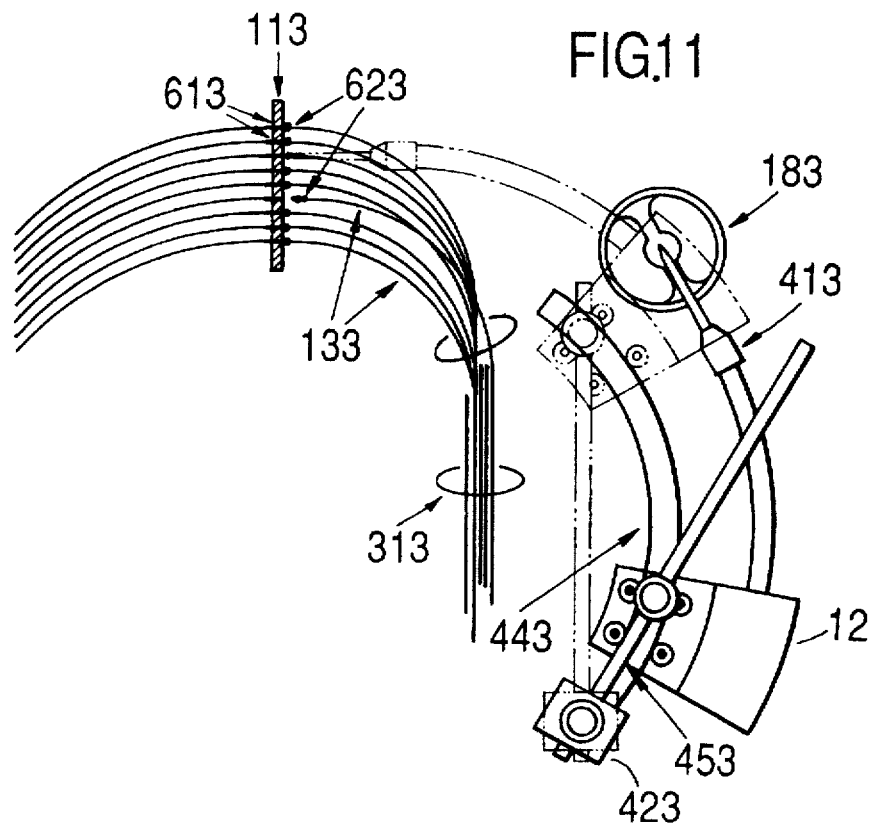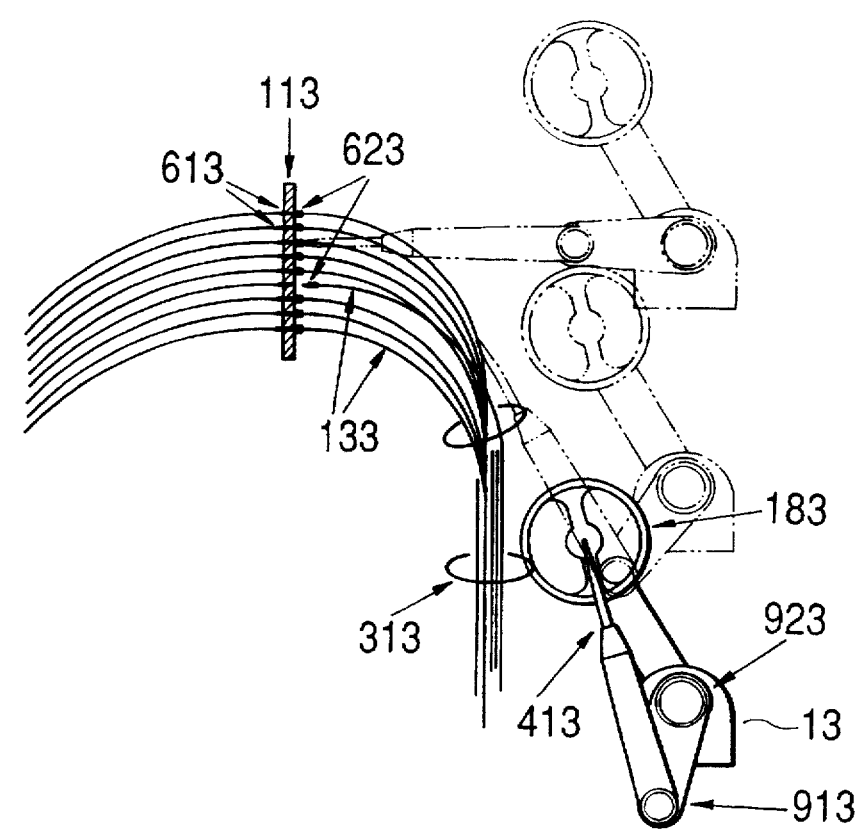

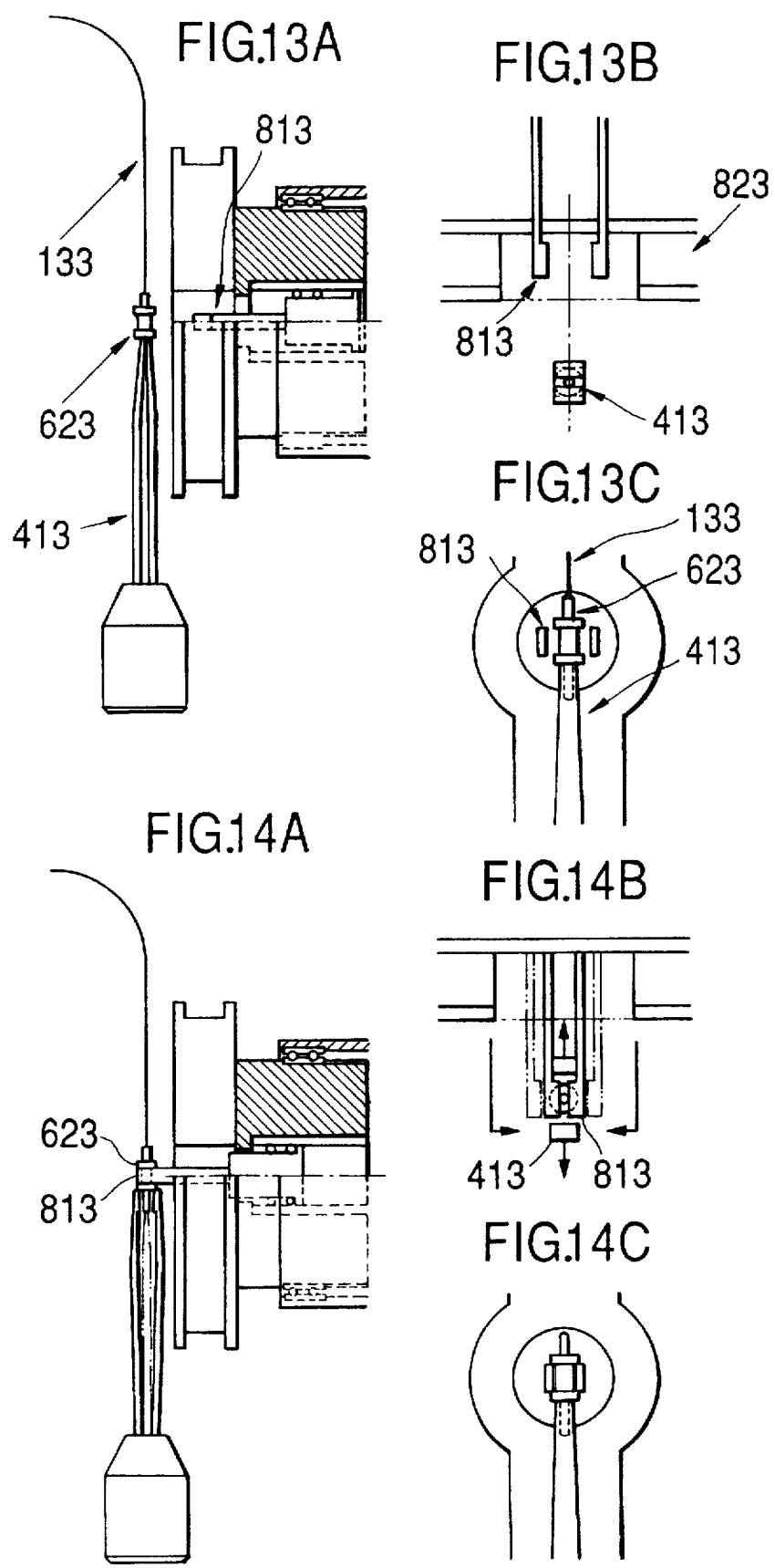

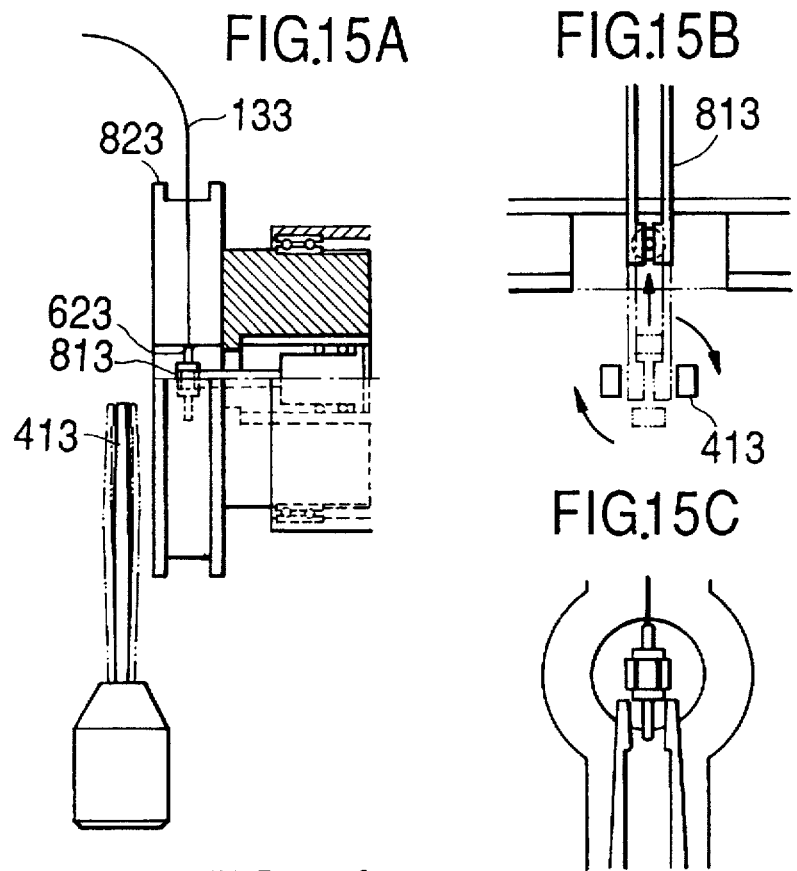
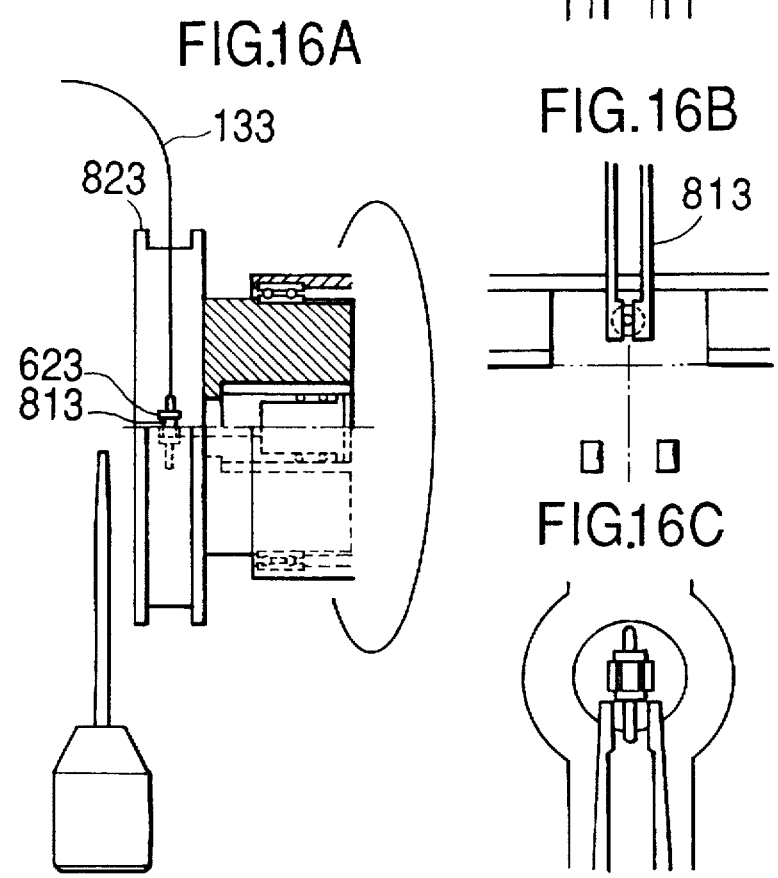

OPTICAL FIBER CROSS CONNECTION APPARATUS AND METHOD

BACKGROUND OF THE INVENTION

1. Field of the Invention

The present invention relates to optical fiber cross connection apparatuses and methods to connect, disconnect, and exchange optical fibers automatically in optical communication systems.

2. Description of the Related Art

With the increase in utilization of optical devices for communication systems, the progress of development of optical fibers in such communication systems and access network cables being connected thereto are advanced. Generally, each terminal is accommodated in an exchange office respectively through an access network cable and is connected to communication networks. In conventional metal-cable systems, cable overhead terminators (which are called "main distributing frames" (MDF)) are equipped at the junction points between access network systems and service network systems. Access network cables are terminated at the MDF. It is possible to implement the cross connection of communication facilities, which is by introduction, movement, etc., of various communication services. Utilization of optical access network cables being accompanied by introduction of optical communication networks makes a cross connection apparatus for the optical cables necessary. When using a metallic cable, because it is possible to cut and connect connection cables easily, operators can manufacture connection cables of required length while at work. However, in the case of using optical cable, it is necessary to prepare beforehand a code (an optical fiber) with an extra length which is sufficient for connection thereof because it is difficult to cut and connect optical cables.

In a conventional technique, cross connection of the optical fibers is implemented manually. Therefore, there is a definite possibility of misconnection of the optical fibers and of contamination and damage of plug tips by careless handling of the optical fibers; therefore, the reliability of the operation tends to below. Furthermore, sizes of plugs and adapters for the optical fibers have to be large enough for manual operation. Therefore, there is a problem in that optical fiber cross connection apparatuses need to be large.

SUMMARY OF THE INVENTION

The invention is directed to solving the problems described above. It is an object of the invention to reduce the size of optical fiber cross connection apparatus and to improve reliability thereof. The present invention provides an apparatus and a method which enable the use of small adapters and plugs which are the parts for connection of optical fibers by employing a robot handling mechanism. The present invention also provides an apparatus and a method to exchange connections of optical fibers automatically.

The present invention contemplates an optical fiber cross connection apparatus for connecting and disconnecting first optical fibers to desired second optical fibers, each of the first optical fibers being equipped with a plug on a tip thereof. The apparatus comprises an arrangement board installed approximately vertically, which has a plurality of alignment holes for releasably holding the plugs and for passing the first optical fibers therethrough. A connection board is installed approximately vertically, on which a plurality of connection adapters are positioned to which the second optical fibers are connected and to which the plugs of the first optical fibers are connectable. A handling mechanism for drawing the first optical fibers from the arrangement board is included so that the first optical fibers are drawn through the alignment holes, and connecting the plugs thereof to desired connection adapters. A roll-up mechanism is included for paying out the first optical fibers when the fibers are drawn through the alignment holes by the handling mechanism, as well as traveling mechanisms for moving the handling mechanism and the roll-up mechanism to a desired position with respect to the connection board and the arrangement board.

The present invention also contemplates an optical fiber cross connection method, with an optical fiber cross connection apparatus for connecting and disconnecting first optical fibers to desired second optical fibers, each of the first optical fibers being equipped with a plug on a tip thereof, the apparatus comprising an arrangement board installed approximately vertically, and which has a plurality of alignment holes for releasably holding the plugs and for passing the first optical fibers therethrough; a connection board installed approximately vertically, on which a plurality of connection adapters are positioned, to which the second optical fibers are connected and to which the plugs of the first optical fibers are connectable; a handling mechanism which has a first plug grip device for drawing the plug from the alignment hole and for inserting the plug into the connection adapters and a second plug grip device for holding a plug, for drawing the first optical fibers from the arrangement board so that the first optical fibers are drawn through the alignment holes, and for connecting the plugs thereof to desired connection adapters; a roll-up mechanism for paying out the first optical fibers when the fibers are drawn through the alignment holes by the handling mechanism; and traveling mechanisms for moving the handling mechanism and the roll-up mechanism to a desired position with respect to the connection board and the arrangement board, which the optical fiber cross connection method comprises, when connecting an objective plug of the plugs to an objective connection adapter of the connection adapters after disconnecting the other plug which has been already connected to the objective connection adapter, a step of disconnecting the plug from the objective connection adapter while the second plug grip device of the handling mechanism holds the objective plug which has been disconnected from one of the connection adapters; and a step of connecting the objective plug to the objective connection adapter.

BRIEF DESCRIPTION OF THE DRAWINGS

FIGS. 2A–2C are drawings showing the operation of the optical fiber cross connection apparatus shown in FIG. 1.

FIGS. 3A–3C are drawings showing the operation of the optical fiber cross connection apparatus shown in FIG. 1.

FIG. 5 is a drawing showing an example of a U-shaped partition member which is attached on a fiber rest board which is one of the components of the optical fiber cross connection apparatus of the present invention.

FIGS. 6A–6C illustrate other examples of the connection board, the arrangement board, and the holding board, all of which are components of an optical fiber cross connection apparatus according to the present invention.

FIGS. 7A and 7B are drawings showing other examples of the fiber rest board, which is one of the components of an optical fiber cross connection apparatus of the present invention.

FIG. 8 is a plan view of the second preferred embodiment of an optical fiber cross connection apparatus according to the present invention.

FIGS. 9A and 9B are, respectively, a side elevation view, partly in cross section, and a front view of finger 602 and optical fiber roll-up bobbin 612, which are provided to first robot hand 382, which is shown in FIG. 8.

FIG. 11 is a side elevation view, partly in section, showing another preferred embodiment of a handling mechanism for optical connectors according to the present invention.

FIG. 12 is a side elevation view, partly in section, showing another preferred embodiment of a handling mechanism for optical connectors according to the present invention.

FIGS. 13A–16C show operation of an optical fiber roll-up mechanism which is provided to an optical connector handling mechanism according to the invention, where FIGS. 13A, 14A, 15A, and 16A are side views; FIGS. 13B, 14B, 15B, and 16B are enlarged plan views of a part of corresponding FIGS. 13A, 14A, 15A, and 16A, and FIGS. 13C, 14C, 15C, and 16C are enlarged front views of a part of corresponding FIGS. 13A, 14A, 15A, and 16A.

DESCRIPTION OF THE PREFERRED EMBODIMENTS

Figure 1:
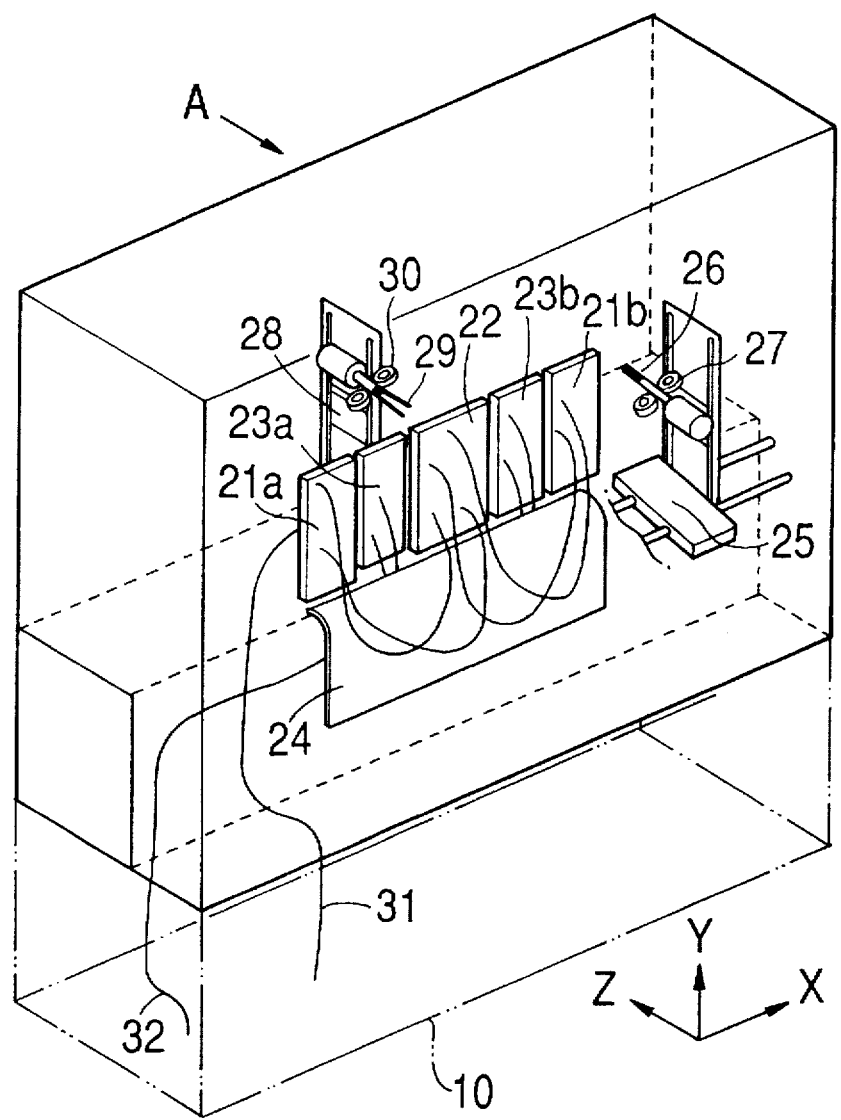
FIG. 1 is a perspective view showing a first preferred embodiment of an optical fiber cross connection apparatus according to the present invention.
Figure 4C:
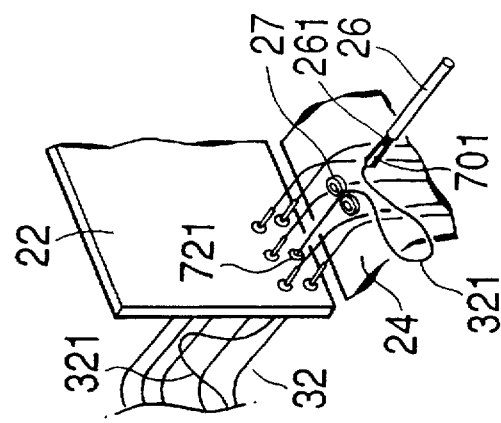
FIGS. 4A–AE are drawings showing the operation of the optical fiber cross connection apparatus shown in FIG. 1.
Figure 4B:
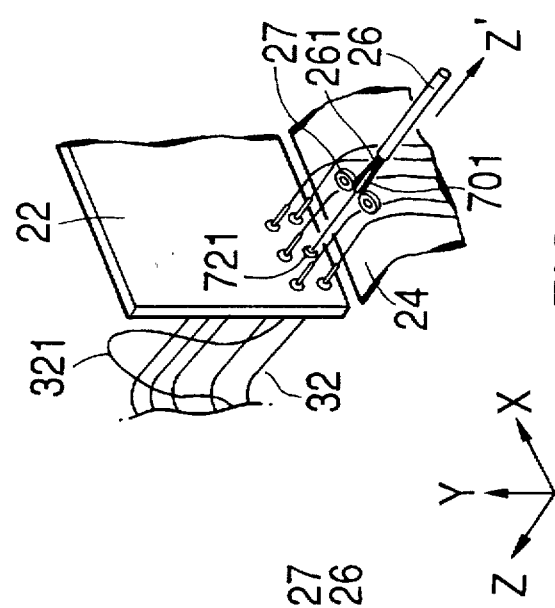
Figure 4E:
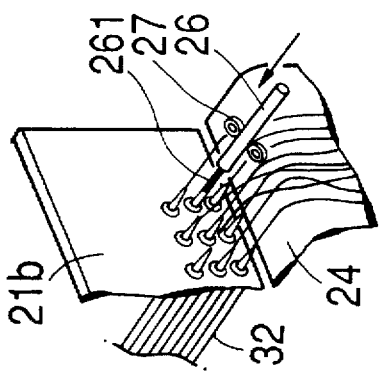
Figure 4A:
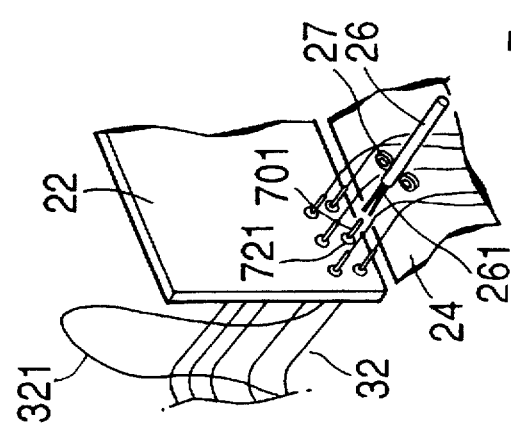
Figure 4D:
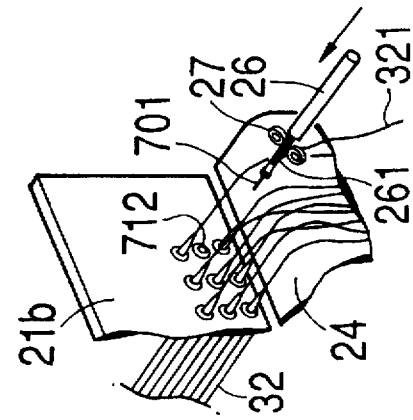

Referring now to the drawings, preferred embodiments according to the invention will be explained.
First Preferred Embodiment and Modification Examples thereof FIG. 1 is a perspective view of a first preferred embodiment of an optical fiber cross connection apparatus according to the present invention. Optical fiber cross connection apparatus 10 which is shown in this figure is an apparatus for exchanging connection of arbitrary optical fibers between optical fiber group 31 on the input side, which comprises multiple optical fibers, and optical fiber group 32 on the output side, which comprises multiple optical fibers. The apparatus 10 comprises connection boards 21a and 21b, arrangement board 22, and holding boards 23a and 23b, which are used for connection and arrangement of each optical fiber. Connection boards 21a and 21b, arrangement board 22, and holding boards 23a and 23b are vertically or approximately vertically provided, respectively. Connection board 21a, holding board 23a, arrangement board 22, holding board 23b, and connection board 21b are arranged on the same plane in this order from the left side of FIG. 1. While two connection boards 21a and 21b and two holding boards 23a and 23b have the same function, respectively, in this case, they are divided in two, respectively, to efficiently exchange connection of multiple optical fibers.

Each optical fiber of optical fiber group 31 on the input side has a plug at the tip, which is a connector on the insertion side. Each plug is connected to one of multiple parts for connection, which may be comprised of adapters, jacks, or connectors on the insertion side and are arranged at one of the surfaces of connection board 21a or 21b, which is the surface seen from the arrow A in this case, and is terminated. Each of the multiple optical fibers of optical fiber group 32 on the output side also has a plug at the tip. Each optical fiber 32 passes through any of the multiple through-holes in the direction of arrow Z, which are formed in holding boards 23a or 23b. These optical fibers 32 are connected to adapters on connection boards 21a or 21b, after further going through the holes on arrangement board 22 in the direction of arrow A. As a result, an arbitrary optical fiber of optical fiber group 31 on the input side and an arbitrary optical fiber of optical fiber group 32 on the output side are connected.

In addition, stopper 42 (see FIG. 3C) is attached to each optical fiber of optical fiber group 32, which is fixed around a middle part of the fiber between a part where the fiber passes through a through-hole in holding board 23a or 23b and a part where the fiber reaches a hole in arrangement board 22, which is fixed at the side seen from arrow A in this case. Stopper 42 is comprised of a cylindrical member, etc., having a size by which stopper 42 cannot pass through a hole in arrangement board 22. Each optical fiber 32 is fixed at a part where fiber 32 passes through a through-hole in holding board 23a or 23b by a fixation member. Therefore, each optical fiber 32 passes through a hole in arrangement board 22 and always forms a U-shape after passing through a through-hole in holding board 23a or 23b, even if the fiber 32 is pulled in the direction of arrow A from the side seen from the arrow Z of arrangement board 22. The length of each optical fiber 32, between the part where stopper 42 is attached thereon and the plug at the tip of the fiber, is desired to be sufficient to form a U-shape after passing through a hole in arrangement board 22. That is, the part of each optical fiber 32, where fiber 32 hangs down and forms a U-shape, can rest against fiber rest board 24, as illustrated in FIG. 1 after passing through a hole in arrangement board 22. Then, each optical fiber 32 has sufficient length as each plug thereof can be inserted into an arbitrary adapter on connection board 21a or 21b.

Each of the holes in arrangement board 22 is comprised of a combination of two holes with different diameters, which form a through-hole having a smaller diameter and an opening having a larger diameter so that the former forms a through-hole and the latter forms only an opening, where only each optical fiber can pass through both the through-hole and the opening freely, but stopper 42 and a plug cannot pass through the throughhole while a part of stopper 42 and the plug can be embedded in the opening. Therefore, when drawing out an optical fiber from the opposite side, a part of stopper 42 or of a plug is held in the opening of a hole in arrangement board 22. Then, in the condition of the remaining part of stopper 42 or the plug being axially stuck out of the hole, stopper 42 or the plug are aligned on arrangement board 22. Fiber rest board 24 is located under connection boards 21a, 21b, arrangement board 22, and holding boards 23a, 23b. Fiber rest board 24 has a shape which hangs down vertically with forming a gentle curve R to project in the direction (the front side) of arrow A.

First robot mechanism 25 is a traveling mechanism to move first handling mechanism 26 and first roll-up mechanism 27 in the axial directions of X, Y, and Z, and second robot mechanism 28 which is another traveling mechanism to move second handling mechanism 29 and second roll-up mechanism 30 in the axial directions of X, Y and Z are installed on both sides of connection boards 21a, 21b, arrangement board 22, and holding boards 23a, 23b. First handling mechanism 26 holds and connects a plug of arbitrary optional optical fiber 32 to an adapter and removes the plug from the adapter. First roll-up mechanism 27 which has one set of roller mechanisms which can be freely opened and closed winds up and pays out optical fiber 32 which plug is taken off from an adapter. Second handling mechanism 29 holds and releases optical fiber 31. Second roll-up mechanism 30 has one set of roller mechanisms that can be freely opened and closed and winds up and pays out optical fiber 32 which plug is taken off from an adapter.

Optical fiber 32 on the output side passes through a through-hole of holding board 23a or 23b, and passes through a hole in arrangement board 22, and connects to an adapter of connection board 21a or 21b in the condition which hangs down onto fiber rest board 24 to form a U. First handling mechanism 26 and first robot mechanism 25 hold the plug, which is connected to the adapter of connection board 21a or 21b by the U-shaped hanging of the optical fiber. That is, all optical fibers 32 whose plugs are connected change the direction thereof downward from the level direction and hang down in U's, except for the part thereof near to the plug. Then, the hanging down bottom part is located at the underside, which is lower than the bottom part of holes on arrangement board 22, and the bottom part of the adapters on connection boards 21a and 21b. Therefore, simply by horizontal displacement of first handling mechanism 26 with which first robot mechanism 25 is equipped (in the Z axial direction), first handling mechanism 26 is able to hold an arbitrary plug.

For comparison, here, in an arrangement board and/or a connection board that is installed horizontally instead of being installed perpendicularly and the plug of an optical fiber is connected to an adapter from bottom to top, which is different from this preferred embodiment, each handling mechanism must advance through numerous optical fibers which are around an optical fiber for the purpose of holding an objective plug of the objective optical fiber. Therefore, it is expected that the resistance of movement will be excessively large in that case. However, in the case of this preferred embodiment, such resistance of movement can be suppressed to a minimum.

Also, by providing fiber rest board 24, an optical fiber which is newly connected can lie on top of the optical fibers of optical fiber group 32, which are already connected, without generating excessive internal stress.

Next, the operation of optical fiber cross connection will be explained. Here, it is assumed that all optical fibers 31 on the input side are already connected to adapters on connection board 21a or 21b, respectively. Moreover, there is at least one unconnected adapter (an adapter to which no plug is connected) on either connection board 21a or 21b.

The case of connecting a plug which is connected to an adapter on connection board 21a to an unconnected adapter on connection board 21b will be explained. In this case, first, the plug of an objective optical fiber 32 is held from the side, which is seen from the direction of arrow Z, by first handling mechanism 26 of first robot mechanism 25. Then the plug is pulled out from the adapter connected thereto on connection board 21a. Next, the optical fiber 32 is held by second handling mechanism 29 of second robot mechanism 28 from the side which is seen from arrow A of arrangement board 22. Then, second roll-up mechanism 30 winds up the optical fiber 32. The plug of the optical fiber 32 is stored in a corresponding hole on arrangement board 22 to be aligned on the surface of the board, which is seen from the direction of arrow Z. Next, first handling mechanism 26 holds the plug, which is now stored in the hole on arrangement board 22. Then first handling mechanism 26 is moved to an objective point by first robot mechanism 25 while first roll-up mechanism 27 winds up the optical fiber 32. The plug is then connected to an objective adapter on connection board 21b. The cross connection operation of one optical fiber is completed by this series of processes: a pulling-out step (removal of a plug), an alignment step, storage on an arrangement board, and a connection step.

Hereinafter, this operation will be explained in detail with reference to the drawings.

FIGS. 2A–2C are operational diagrams explaining the details of the operation to remove, by pulling out, a plug from connection board 21a.

When pulling out the plug 701 at the tip of the objective optical fiber 321 from the adapter 711 of connection board 21a, to adjust the position of first handling mechanism 26 with which first robot mechanism 25 is equipped (see FIG. 1) to the position of the objective plug, first robot mechanism 25 is driven to move the base of first handling mechanism 26. First handling mechanism 26 is positioned corresponding to the position of the plug 701 of the optical fiber 321 on connection board 21a. Plug 701 is held by finger 261 of first handling mechanism 26 (see FIG. 2A). First handling mechanism 26 is moved in the direction Z', which is opposite to the direction Z, in the condition which holds the plug 701, and the plug 701 of the objective optical fiber 321 is pulled out and removed from the adapter 711 on connection board 21a (see FIG. 2B). Next, finger 261 of the first handling mechanism 26 opens and releases the plug 701 (see FIG. 2C).

FIGS. 3A–3C are operational diagrams explaining an operation for storing the optical fiber 321, which is pulled out, and removed from connection board 21a on arrangement board 22. FIGS. 3A–3C are drawn from the direction of arrow A (see FIG. 1).

In the case of rolling up the optical fiber 321, which has been pulled out, and storing and aligning the plug 701 thereof on arrangement board 22, second handling mechanism 29 of the second robot mechanism 28 is positioned at the position corresponding to the optical fiber 321 in the reverse of arrangement board 22. Then, finger 291 of second handling mechanism 29 holds stopper 42 (see FIG. 3A). While holding this stopper 42, second handling mechanism 29 moves in the axial direction Z (i.e., in the direction of the front side of the figure); and the optical fiber 321 is drawn out to the front of the second roll-up mechanism 30 (see FIG. 3B). Next, the roller of second roll-up mechanism 30 is closed to wind up the optical fiber 321 (see FIG. 3C). This roll-up operation continues until completion of storage and alignment of the plug 701 into the hole 721 of arrangement board 22 is detected. A proximity sensor, which detects the approach of the metallic part of the plug 701 or a photoelectric sensor to detect reflected light therefrom, may be used for this detection.

FIGS. 4A–4E are operational diagrams explaining an operation to connect the plug 701 to an objective adapter on connection board 21b after drawing out the plug 701 which has been stored and aligned into the hole 721 of arrangement board 22. First handling mechanism 26 of first robot mechanism 25 (see FIG. 1) is positioned at the position corresponding to the optical fiber 321 whose plug 701 is stored on arrangement board 22 to draw out the plug 701 of arrangement board 22. Then, finger 261 of first handling mechanism 26 holds the tip part of the plug 701 (see FIG. 4A). The plug 701 is drawn out by moving first handling mechanism 26 in the axial direction Z', which is opposite to the direction Z, while the tip part of the plug 701 is held by finger 261 of first handling mechanism 26 (see FIG. 4B). The roller of first roll-up mechanism 27, equipped on first robot mechanism 25, is closed, and optical fiber 321 is paid out (see FIG. 4C). This paying-out is terminated and is detected in which the condition where stopper 42, which is attached to optical fiber 321, (see FIG. 3C) is stored and aligned into hole 721 of arrangement board 22.

Next, first handling mechanism 26 releases the plug 701 and holds it again to turn over by 180 degrees the plug 701 of the optical fiber 321, which has been paid out to stopper 42. That is, the first handling mechanism 26 holds a portion near the border of optical fiber 321 of the plug 701 from the direction of optical fiber 321 (not illustrated). First, handling mechanism 26 in this operational condition is positioned at a part corresponding to an objective adapter 712 of connection board 21b (see FIG. 4D). Then, first handling mechanism 26 is moved in the axial direction off and first handling mechanism 26 connects the plug 701 to the adapter 712 (see FIG. 4E).

By such operation as described above, an objective plug which is connected to an arbitrary adapter on connection board 21a can be connected to an arbitrary unconnected adapter on connection board 21b. In this preferred embodiment, since an optical fiber which is newly connected to an adapter is piled on the other already connected optical fiber group, this embodiment may realize a connection condition with high reliability.

FIG. 5 shows a modified example of the fiber rest board 24 shown in FIG. 1. Fiber rest board 24S shown in FIG. 5 is different from fiber rest board 24 shown in FIG. 1 in that fiber rest board 24S has U-shaped partition member 51 on the upper and the center part thereof. In this case, only one each of arrangement-board 22S, connection board 21S, and holding board 23S are provided; the preferred embodiment shown in FIG. 1 also differs in this point.

After a plug of an objective optical fiber 32 is pulled out and is removed from an adapter on connection board 21S by first robot mechanism 25 (see FIG. 1), second roll-up mechanism 30 (see FIG. 1) winds up this optical fiber 32. By this operation, the optical fiber 32 with the plug is aligned and stored on arrangement board 22S. Because there is U-shaped partition member 51 on fiber rest board 24S under holding board 23S in this case, this optical fiber 32 is wound up along the side wall of partition member 51. Therefore, optical fiber 32 forms a U-shape, which has an arc larger than the arc of the side wall of partition member 51. The plug at the tip thereof is stored and aligned on arrangement board 22S. Therefore, this optical fiber 32 during the cross connection operation and the other connected optical fibers 32 may be prevented from excessive stress. Another arrangement example of the arrangement board, the connection board, and the holding board is shown in FIG. 6.

In FIG. 6A, connection board 216 and holding board 236 are not divided in two. They are arranged on the identical vertical surface on both sides of arrangement board 226. In FIG. 6B, holding board 236 is arranged between arrangement board 226 and connection board 216. In FIG. 6C, the holding board is divided into two boards 236a and 236b which are arranged on vertical surfaces above and below arrangement board 226. Connection boards 216 and 226 are arranged on the flush surface.

In addition, in FIGS. 6A–6C, the width of fiber rest board 246 or 246b may be equal to the total X axial width of the arrangement board, the connection board, and the holding board, or may be of a larger size.

Although these examples are different from the example shown in FIG. 1 where connection boards 21a and 21b are divided into two (right and left) on both sides of arrangement board 22, a similar effect may be obtained even if a connection board is arranged at the center, and an arrangement board is divided into two on the both sides of the connection board.

FIGS. 7A and 7B are perspective views of other examples of the fiber rest member. FIG. 7A shows an example including fiber rest boards 64 and 68 (up and down). That is, fiber rest board 64 on the upper side is arranged between a group consisting of connection board 61, arrangement board 62, and holding board 63 on the upper side and another group consisting of connection board 65, arrangement board 66, and holding board 67 in the lower side. On the other hand, fiber rest board 68 is arranged under the lower group consisting of connection board 65, arrangement board 66, and holding board 67. In the example shown in FIG. 7B, fiber rest stick 69, which is a fiber rest member, is arranged among connection board 61, arrangement board 62, and holding board 63 on the upper side, and connection board 65, arrangement board 66, and holding board 67 in the lower side. By the arranging fiber rest members on both upper and lower sides, it is possible to prevent optical fibers from being bent and to improve reliability of cross connection.

In addition, although fiber rest members divided in two are shown only in FIGS. 7A and 7B, the number of division is not limited by two, i.e., it may be several pieces or tens of pieces.

Also, a connection board, a arrangement board, and a holding board have been explained as being in the vertical direction but they may be arranged in a different direction. In this case, there is an advantage that transformation of optical fibers around the root thereof is eased.

The case where the tip of an optical fiber on the input side is always connected to an adapter of the connection board, and the plug at the tip of an optical fiber on the side of output is pulled out and removed from an adapter and is connected to the adapter is explained above. However, it is also possible that the apparatus at the tip of an optical fiber on the output side is always connected to an adapter of the connection board, and the plug at the tip of an optical fiber on the input side is connected to or removed from an adapter.

As described above, because both a connection board and a arrangement board are arranged on a vertical surface in this preferred embodiment, there is an advantage that it is possible to more easily perform in a maintenance check compared with the case where these boards are installed in a horizontal plane. Also, there is an advantage that it is easy to make a connection board and a arrangement board as a module since both are arranged on a vertical surface.

Moreover, because great stress is not loaded on optical fibers by arranging a fiber rest board under the connection board and the arrangement board, the scale of connection terminals may be larger than in a conventional technique (e.g., more than the scale with 4000 input fibers and 4000 output fibers). With a connection board and a arrangement board are arranged in a horizontal plane, if a large connection scale is tried, a bunch of optical fibers between the connection board and the arrangement board would lump together. Because it is difficult for a bunch of optical fibers to be transformed when trying to connect a new plug to an adapter of the connection board in such a condition, great stress is added to the optical fibers. Based on an estimation of the inventor, in such a case, it is difficult to make the scale of connection terminals more than 1000 connections.

Second Preferred Embodiment

FIG. 8 is a plan view of a second preferred embodiment according to the present invention, where each board is drawn as a section Optical fiber cross connection apparatus 11 which is shown in this figure is comprised of optical fibers 312 (312a–312c) equipped with optical connector plugs 322 (322a–322c), optical fibers 332 (332a–332c) equipped with optical connector adapters 342 (342a–342c), arrangement board 352 for plugs 322, alignment holes 362 (362a–362c), connection board 372 for adapters 342, first robot hand 382, second robot hand 392, stoppers 402, which are respectively attached to optical fibers 312 (402a–402c), holding board 412 for optical fibers 312, fixation parts 422 for optical fibers 312 (422a–422c), first finger 502 of first robot hand 382, second finger 602 of first robot hand 382, bobbin 612 for winding up optical fiber 312, which is installed in first robot hand 382, finger 512 of second robot hand 392, and roller 522 for winding up and paying out optical fiber 312, which is installed in second robot hand 392. Multiple adapters 342, multiple alignment holes 362, etc. are arrayed on corresponding boards, respectively.

In the case shown in this figure, arrangement board 352, connection board 372d holding board 412 are arranged on an approximately identical and vertical surface. Optical fiber 312 and optical fiber 332 may be comprised of a single mode optical fiber, multi-mode optical fiber, etc. Plug 322 is attached to one end of optical fiber 312 and the other end thereof is, for example, connected to an-optical fiber of a line. Optical fiber 312 passes through alignment hole 362 and is fixed by fixation part 422 on holding board 412. Moreover, stopper 402 is provided between plug 322 and fixation part 422 on optical fiber 312. Stopper 402 is attached on the opposite side of plug 322 to arrangement board 352. Alignment hole 362 has a size which plug 322 and stopper 402 cannot pass through. Adapter 342 is attached to one end of optical fiber 332 and the other end thereof is, for example, connected to an optical fiber inside an office. Adapter 342 is installed in connection board 372.

This second preferred embodiment has a strong point that even if the number of adapters 342 is equal to the number of plugs 322, i.e., even if no extra adapter for cross section is included, cross connection of optical fibers can be implemented.

Since it is possible to open and shut the two roller parts of roller 522, when the rollers are opened, finger 512 can pass between them. First robot hand 392 and second the robot hand 382 are installed to be movable horizontally and up and down to a surface formed by arrangement board 352, connection board 372 and holding board 412.

First finger 502 of first robot hand 382 pulls out an arbitrary plug 322 from alignment hole 362 of arrangement board 352, moves the plug 322 to the front of connection board 372, and inserts the plug 322 into an arbitrary adapter 342 of connection board 372. First finger 502 and second finger 602 hand over a plug to each other, and second finger 602 temporarily holds the plug. Bobbin 612 of first robot hand turns with second finger 602. This bobbin 612 winds up the optical fiber to which the plug 322 is connected, which first finger 502 is holding.

FIG. 9A is a detailed enlarged view of second finger 602 and bobbin 612, which installed in first robot hand 382, and FIG. 9B is a side view of FIG. 9A.

Bobbin 612 is comprised of two parts like an arc, which have two brims and a hole in the center thereof and second finger 602 is installed in the center hole of bobbin 612 that can move forward and backward in the X direction. When second finger 602 and bobbin 612 turn, second finger 602 is dragged into the hole in the center of two arc shaped parts of bobbin 612. At this time, a fiber is wound up between two brims of two arc shaped parts.

An optical fiber cross connection method that uses optical fiber cross connection apparatus 11 according to the invention, which is shown in FIG. 8, will be explained in following. At first, all plugs 322 are temporarily connected to optical connector adapters 342. After that, the cross connection operation is implemented. An operation to exchange plug 322a and plug 322b, which are shown in FIG. 8, will be explained as an example of this cross connection operation. In this operation, plug 322a is moved from adapter 342b to adapter 342a and plug 322b is moved from adapter 342a to adapters 342b.

Figure 10A:
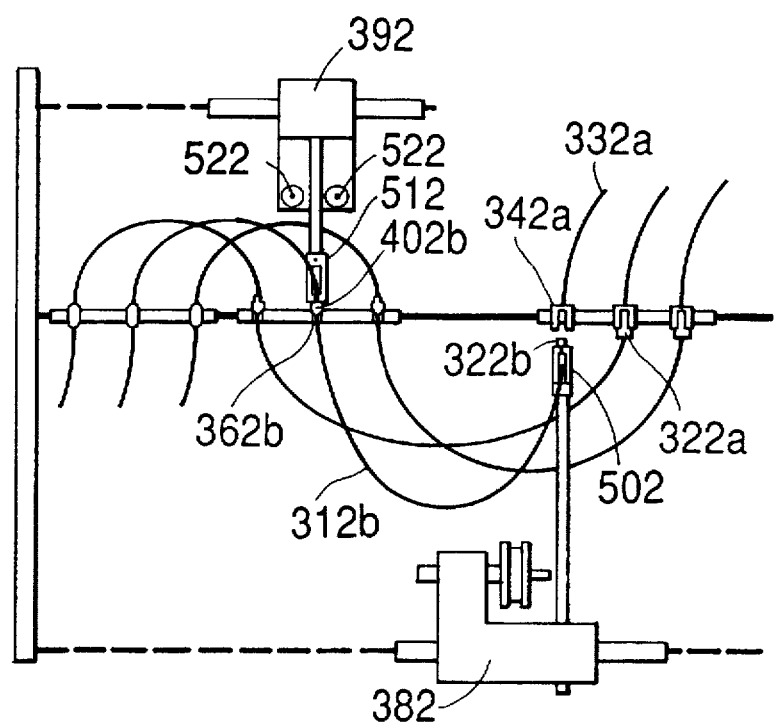
FIGS. 10A–10N are drawings showing operation with the optical fiber cross connection method in the second preferred embodiment shown in FIG. 8.
Figure 10B:
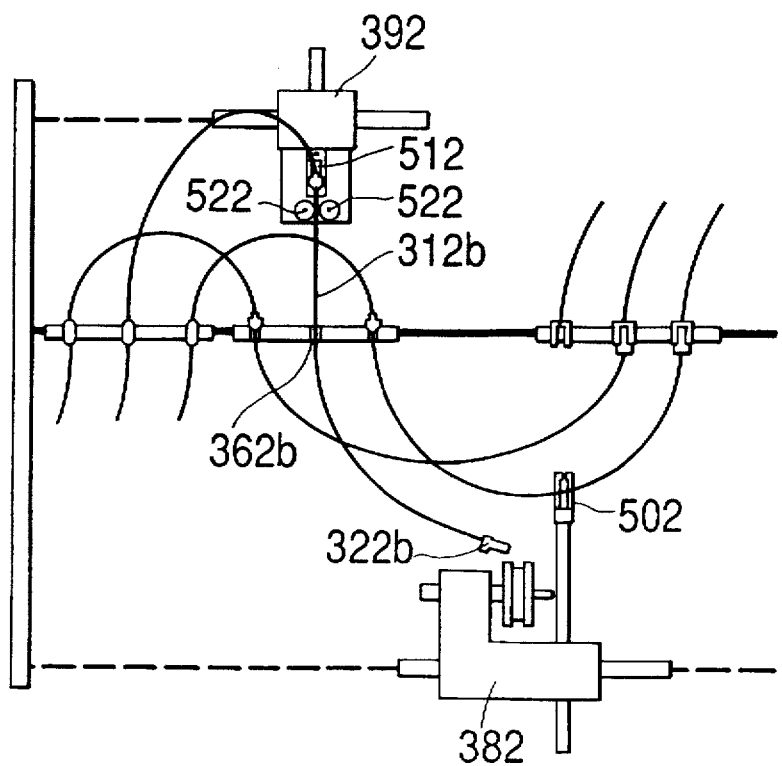
Figure 10C:
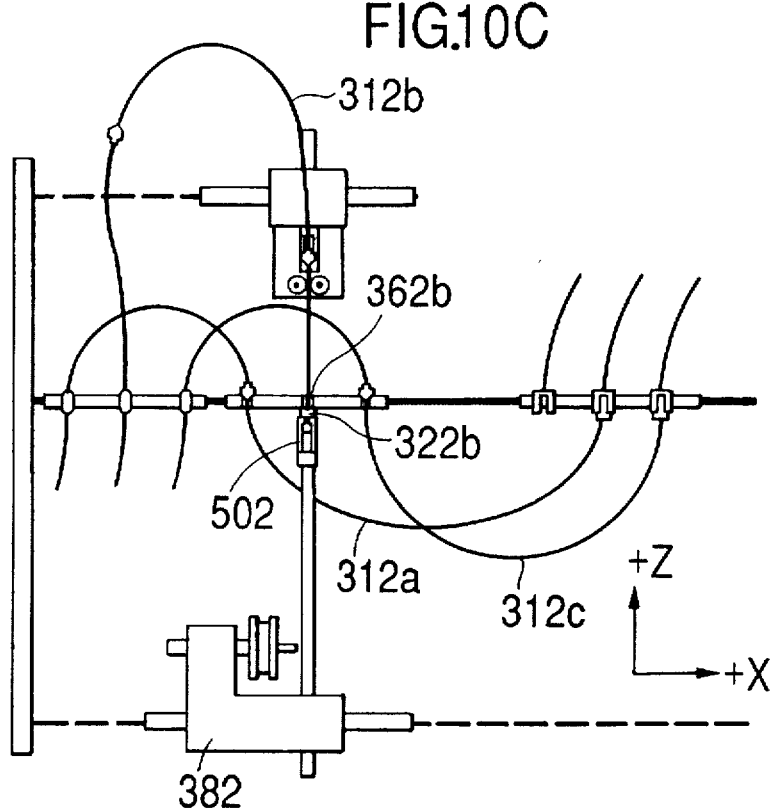
Figure 10D:
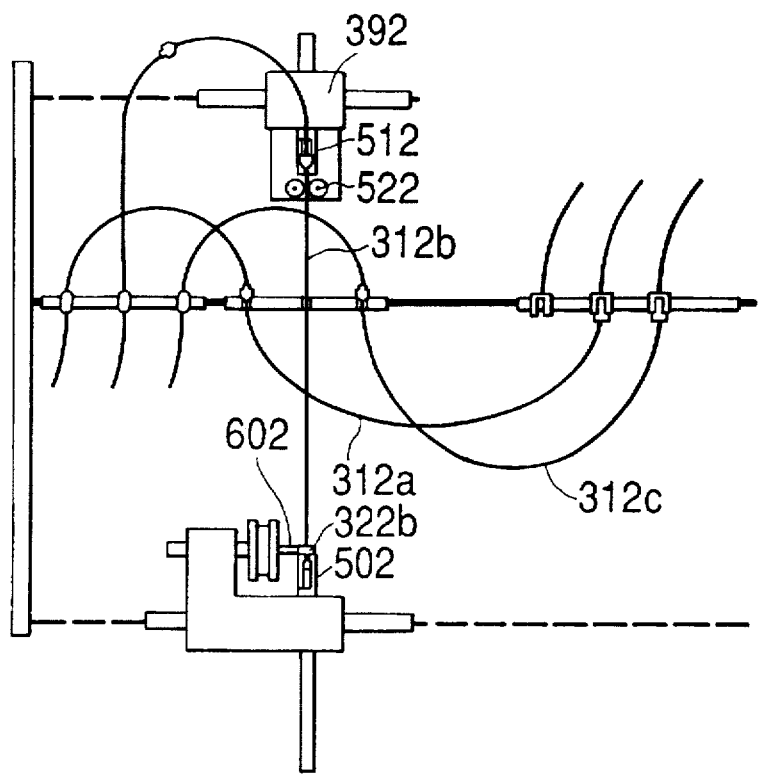
Figure 10E:
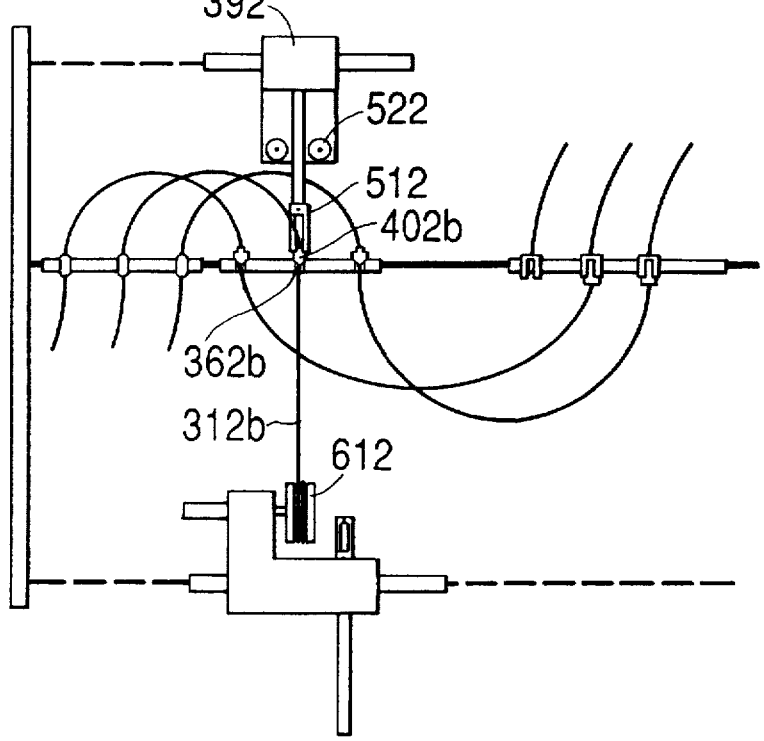
Figure 10F:
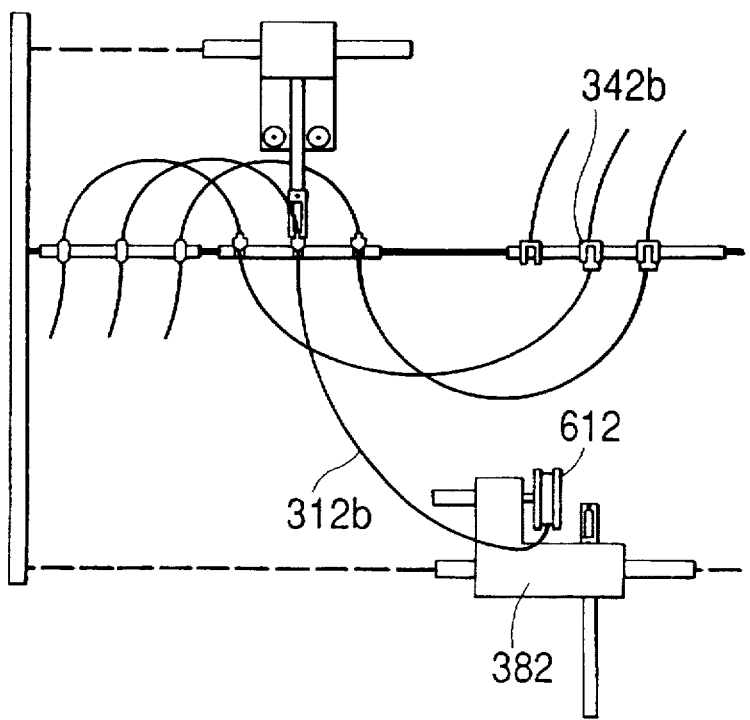
Figure 10G:
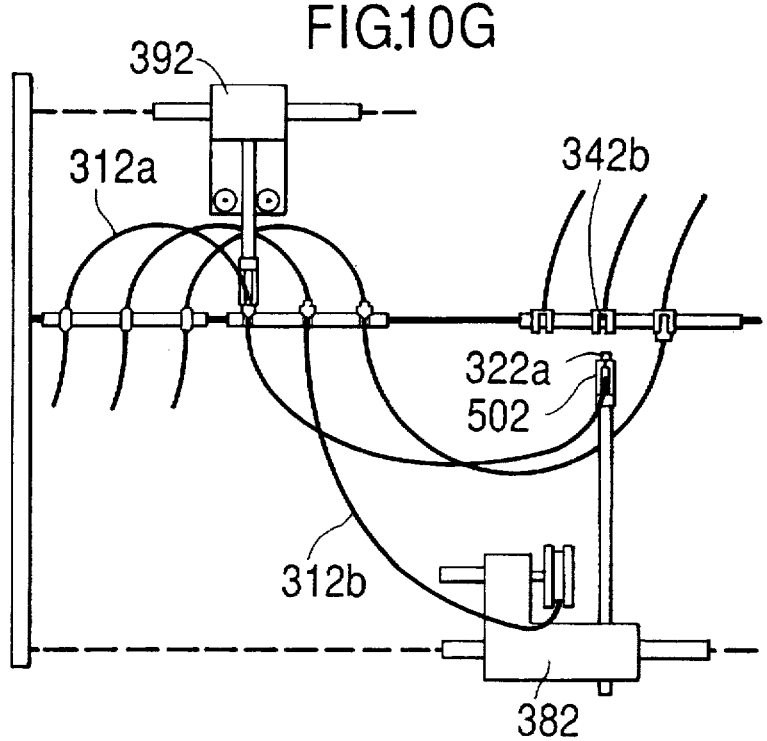
Figure 10H:
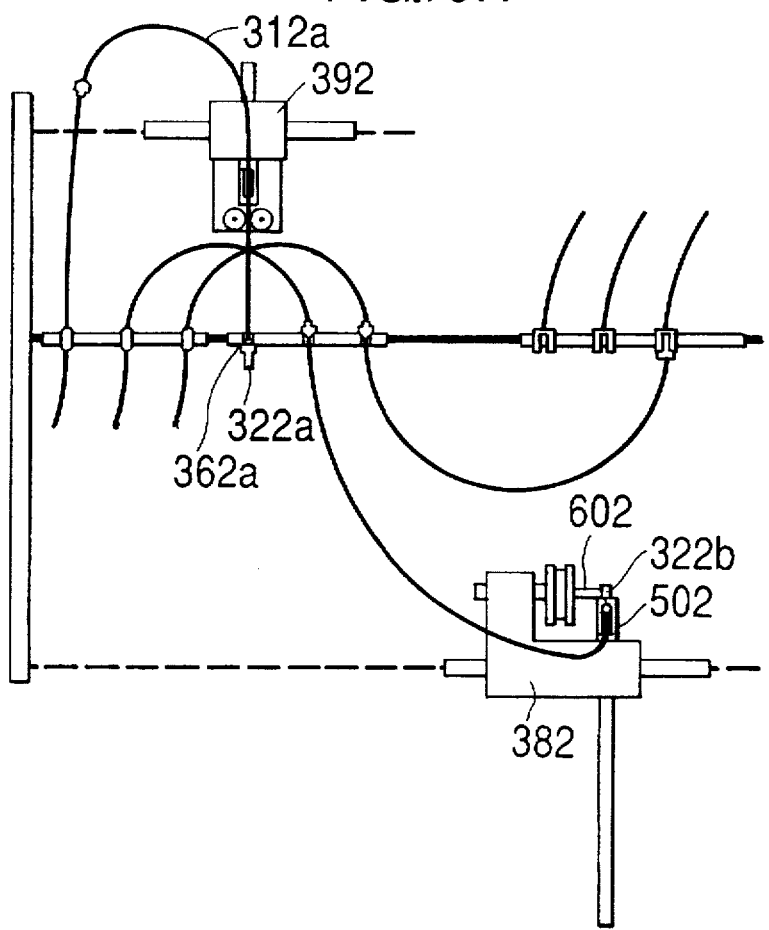
Figure 10I:
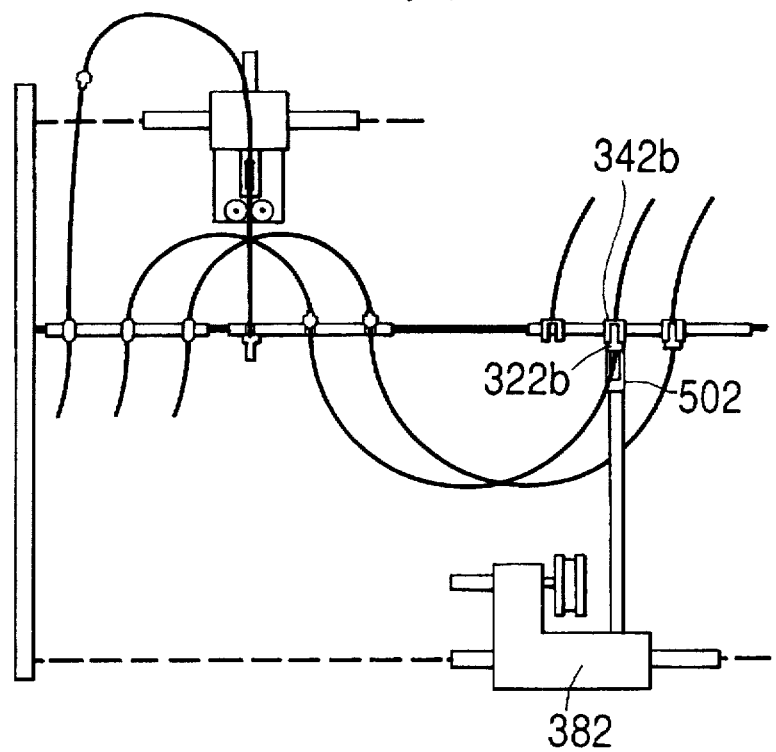
Figure 10J:
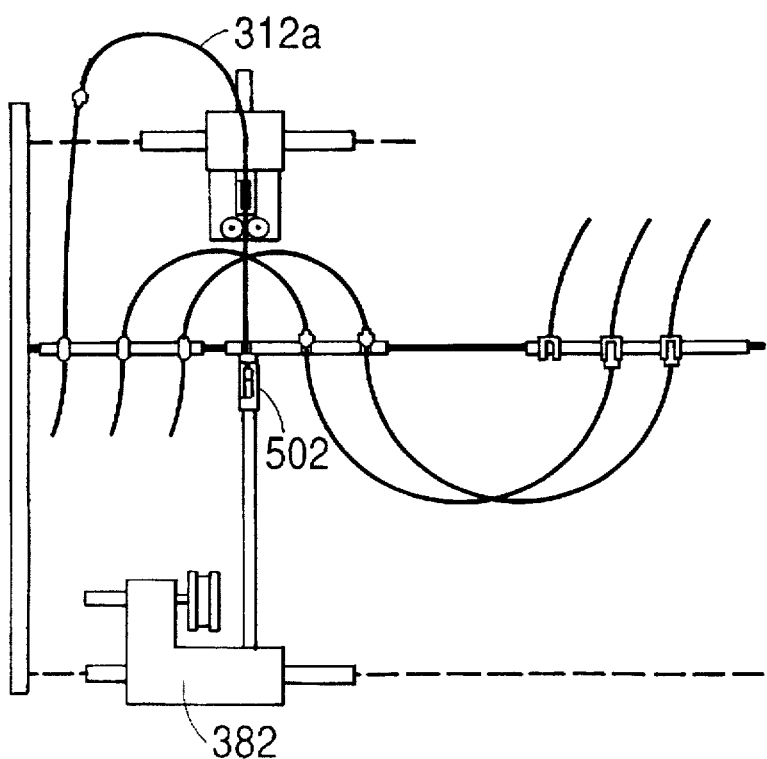
Figure 10K:
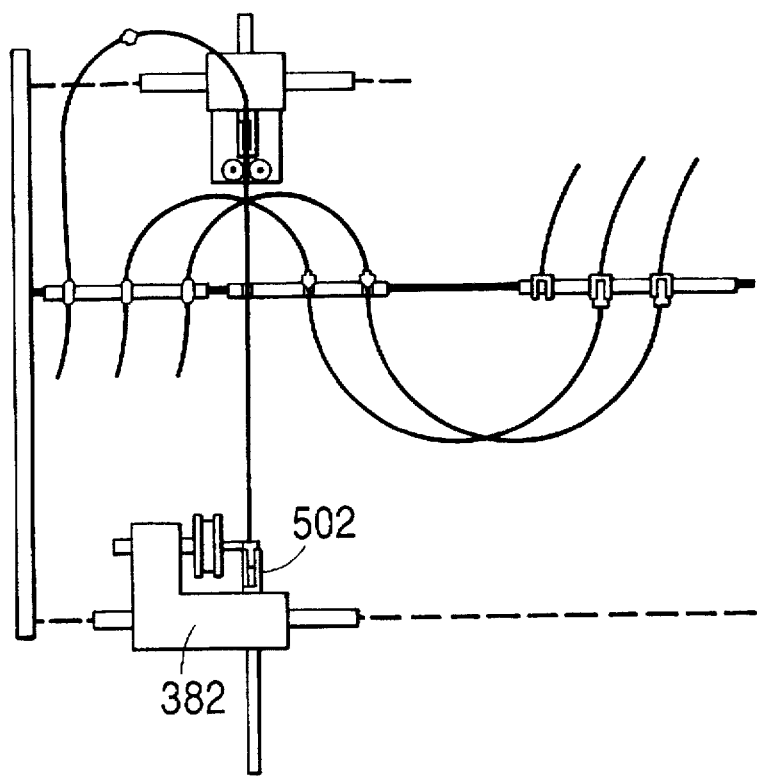
Figure 10L:
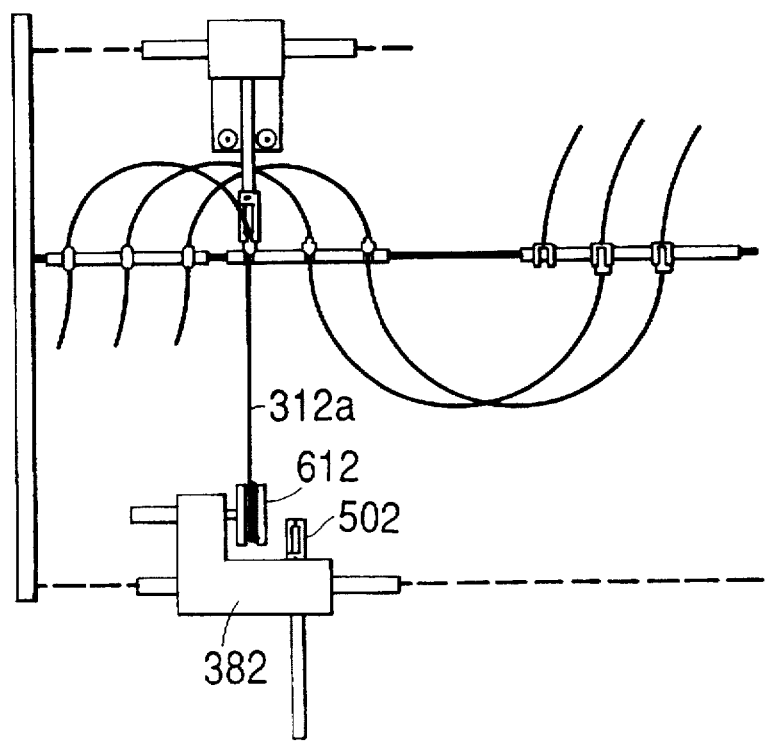
Figure 10M:
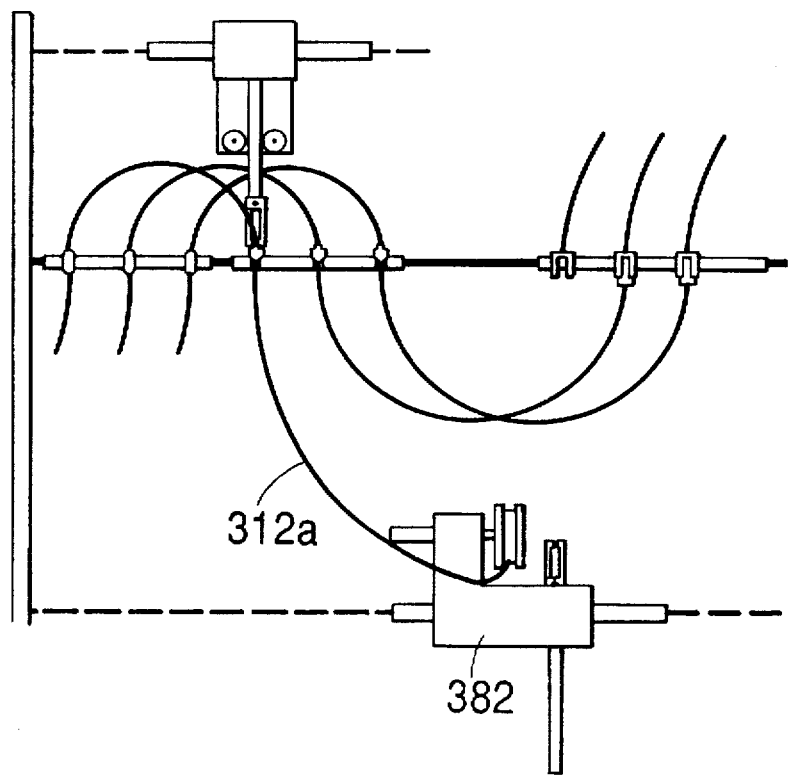
Figure 10N:
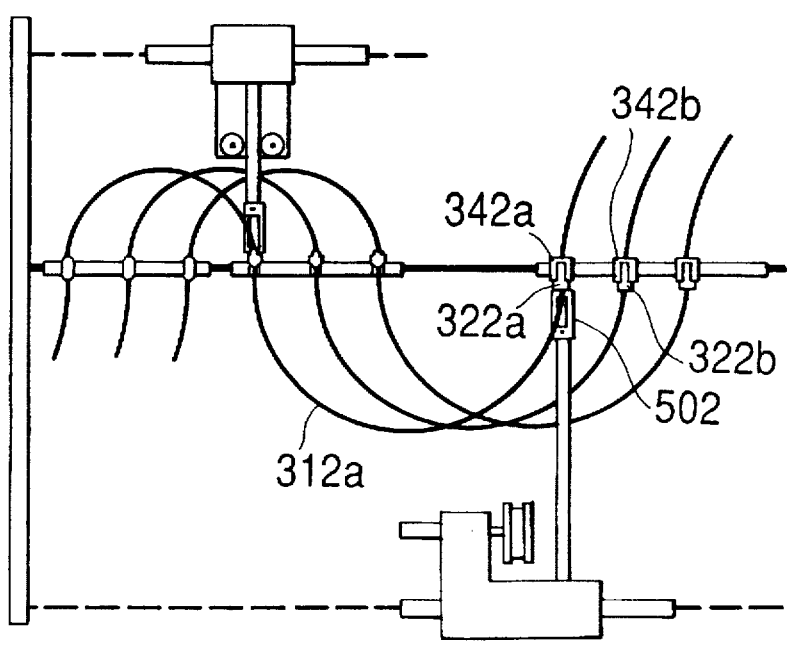

FIGS. 10A–N show this operation step by step. First, first robot hand 382 pulled out and removed plug 322b from adapter 342a (see FIG. 10A). Immediately, plug 322b is released from finger 502. Then, second robot hand 392 draws out stopper 402b in front of one pair of rollers 522 which are opened at that time by using finger 512. Next, roller 522 is closed (see FIG. 10B); and optical fiber 312b is rolled up, and plug 322b is aligned to alignment hole 362b.

Next, first robot hand 382 pulls plug 322b out of alignment hole 362b with finger 502 (see FIG. 10C). Plug 322b is drawn out in the direction of-Z to a position where finger 502 does not touch other connected optical fibers 312a, 312c, etc. After that, plug 312a is held by second finger 602 instead of finger 502 (see FIG. 10D). Then, bobbin 612 rolls up optical fiber 312b. M the same time, second robot hand 392 pays out optical fiber 312b by roller 522 until stopper 402b hits roller 522. After that, finger 512 holds stopper 402b; and stopper 402b is moved through a pair of rollers 522, which are opened until stopper 402b is moored at alignment hole 362b (see FIG. 10E). Next, first robot hand 382 moves to a position corresponding to adapter 342b, which is the mating part of plug 322b, while first robot hand 382 uncoils optical fiber 312b from bobbin 612 (see FIG. 10F). Then, finger 502 pulls out and removes plug 322a, which is connected to adapter 342b (see FIG. 10G). Finger 502 immediately releases plug 322a, optical fiber 312a is wound up by second robot hand 392, and plug 322a is aligned with alignment hole 362a. At the same time, plug 322b is transferred from second finger 602 to first finger 502 of first robot hand 382 (see FIG. 10H).

Then, plug 322b is connected to adapter 342b by first finger 502 (see FIG. 10I). After this, optical fiber 312a is wound up by bobbin 612 (FIGS. 10J–10L). Then, plug 322a is connected to-adapter 342a by the first finger 502 (see FIGS. 10M and 10N). Here, cross connection operation for plugs 322a and 322b ends.

This preferred embodiment provides second finger 602 for holding a plug on first robot hand 382 in addition to first finger 502 which draws out the plug from an alignment hole, moves it, and inserts it to an adapter. With this feature of this preferred embodiment, in the case of connecting an arbitrarily plug A to an arbitrary adapter C to which another plug B is already connected, it is possible to keep the plug B held by second finger 602 after the plug B is pulled out from the adapter C. With this preferred embodiment, cross connection of two plugs can be completed by two sets of basic operations consisting of a pulling-out step and an insertion step of the plugs.

On the other hand, in the case of cross connection without a second finger for holding a plug, it is necessary to prepare a number of adapters which is greater than the number of plugs at least by one. Also, the concerned plug must be temporarily sheltered in an empty adapter. Therefore, it is necessary to repeat the above-described basic operation three times to complete the cross connection in the two plugs.

As described above, this second preferred embodiment does not need any extra operation and can, therefore, realize time reduction in the cross connection operation.

Moreover, because no spare adapter for cross connection is necessary, any optical adapter is not left in an unconnected condition for long. Therefore, the probability that dust and/or dirt will adhere into an optical adapter can be decreased and the possibility that connection loss increases by dust and/or dirt adhering to an optical plug can be decreased.

Third Preferred Embodiment and Modifications thereof

FIG. 11 is a schematic view of another example of the handling mechanism or the robot hand shown in the first and the second preferred embodiments according to this invention. As shown in FIG. 11, in this preferred embodiment, handling mechanism 12 is comprised of finger mechanism 413 to hold plug 623, finger traveling mechanism 423 to move finger mechanism 413 in an arc towards connection board 113, and roll-up mechanism 183 to roll up optical fiber 133. Finger traveling mechanism 423 is comprised of rail 443, which arcs, and driving mechanism 453, for example, such as a ball screw, etc. By driving driving mechanism 453, finger mechanism 413 moves along circular arc-type rail 443. By this operation, finger mechanism 413 moves an optical fiber group 313 while finger mechanism 413 divides optical fibers 133 and tracks an arc towards connection board 113. Then, plug 623 on connection board 113 or arrangement board is held by opening and shutting the tip of finger mechanism 413.

Since the track which finger mechanism 413 traces is determined by the shape of circular arc-type rail 443, it is desirable to design the shape of circular arc-type rail 443 beforehand according to a desired orbit. In addition, if designing the shape of this circular arc-type rail 443 appropriately, it is obvious that it is also possible to make finger mechanism 413 move in the perpendicular direction to connection board 113 in front of connection board 113.

In the above explanation, a case where finger mechanism 413 operates onto connection board 113 is described but if replacing connection board 113 with arrangement board, it is also obvious that a finger mechanism may operate completely in the same way on the arrangement board.

On the other hand, when optical fiber 133 is pulled out and removed from connection board 113, is once aligned on an arrangement board, and then is connected to another adapter 613 on connection board 113, an operation to draw out optical fiber 133, from the arrangement board, is necessary. Optical fiber roll-up mechanism 183 to roll up optical fiber 133, which is drawn out from the arrangement board, is provided at a position where finger mechanism 413 recedes, for this purpose.

Another preferred embodiment of a handling mechanism which is different from what is shown in FIG. 11 is shown in FIG. 12. In this preferred embodiment, shown in FIG. 12, the finger traveling mechanism of handling mechanism 13 has 2-link structure. In the preferred embodiment which is shown in FIG. 11, the orbit of finger mechanism 413 is uniquely determined by the shape of circular arc-type rail 443. However, in this preferred embodiment shown in FIG. 12, freely movable operation of finger mechanism 413, which is combined by the angle change of each of first joint 913 and second joint 923 and the position change of an up and down direction of second joint 923, which depends on the up and down movement of handling mechanism 13, is obtainable. With this structure, it may be possible to move a finger tip towards connection board 113 along an arbitrary orbit. In this case, the position in an up and down direction of second joint 923 can be adjusted freely by using a mechanism like first robot mechanism 25, which is shown in FIG. 1.

Since optical fiber roll-up mechanism 183 is provided at a position where finger mechanism 413 recedes as the preferred embodiment shown in FIG. 11, it is also possible to draw out an optical fiber having relatively long length by the preferred embodiment, shown in FIG. 12.

An operation to transfer plug 623 between finger mechanism 413 and hand 813 for rolling-up, which hand 813 corresponds to second finger 602 in FIG. 9A, shown in FIG. 11 or FIG. 12, will be explained referring to FIGS. 14A–16C.

First, plug 623, which is held by finger mechanism 413, is positioned on the turn axis of roll-up drum 823 (FIGS. 13A–C). Next, hand 813, for roll-up, advances on the turn axis of roll-up drum 823 to hold plug 623, which is held by finger mechanism 413. Finger mechanism 413 releases plug 623 simultaneously (FIGS. 14A–14C). Moreover, finger mechanism 413 turns and shelters, and hand 813 for roll-up retreats to drag plug 623 into the turning center of roll-up drum 823 simultaneously (FIGS. 15A–15C). M that time, it is also possible to move a whole handling mechanism 11 or 12 by a mechanism such as first robot mechanism 25, which is shown in FIG. 1. In this case, without changing the position of plug 623 to connection board 113, plug 623 can be dragged into the center of roll-up drum 823.

As a method to shelter finger mechanism 413, it is also possible to use a method for finger mechanism 413 itself to retreat further to shelter by a method of turning finger mechanism 413 in this preferred embodiment.

While hand 813 for the roll-up holds plug 623 after plug 623 is transferred to hand 813 for roll-up, roll-up drum 823 turns with hand 813 for the rolling-up. Then, roll-up drum 823 winds up optical fiber 133 (FIGS. 16A–16C). Therefore, optical fiber 133 is able to be drawn out from the arrangement board without moving handling mechanism 11 or 12 to draw out optical fiber 133.

It is also possible to apply the optical fiber roll-up mechanism by this preferred embodiment to an exchange operation of a plug, which is necessary when connecting a plug on the arrangement board to an adapter on the connection board as described with regard to the first and the second preferred embodiments. That is, by turning plug 623 by 180 degrees, which is held by hand 813 at the same place without dragging the plug into the center of roll-up drum 813 in the above-described optical fiber roll-up operation, the direction of plug 623 can be reversed. Therefore, it is not necessary to use a special plug transferring mechanism in a finger mechanism, which may simplify the mechanisms.

Figure 17A:
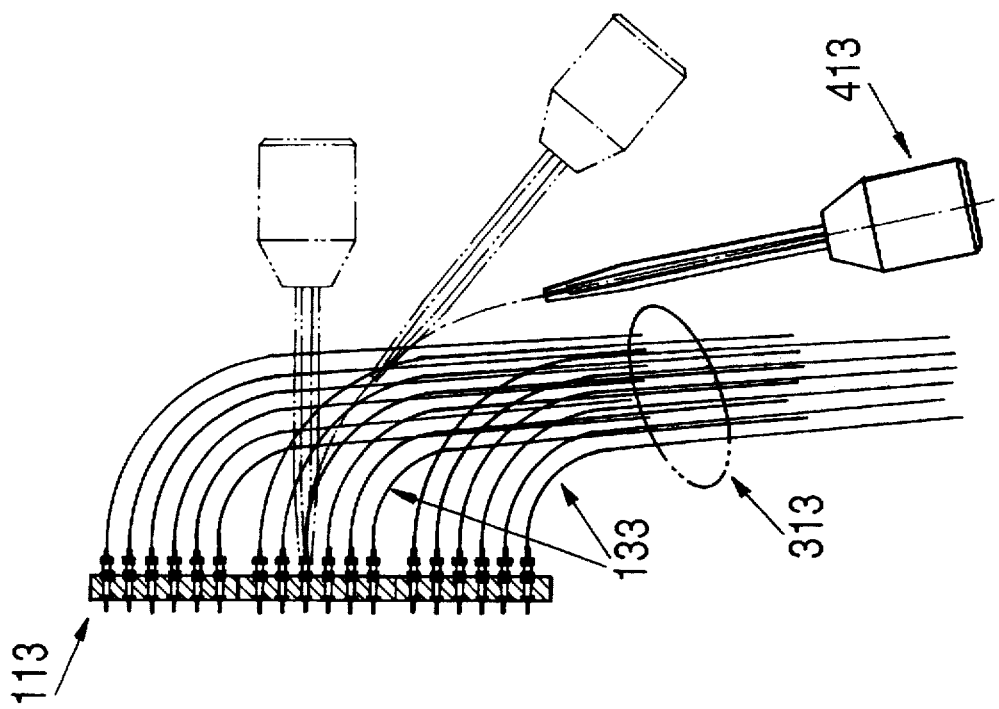
FIGS. 17A and 17B show operation of a linear moving type of the handling mechanism and a curved moving type of the handling mechanism, respectively.
Figure 17B:
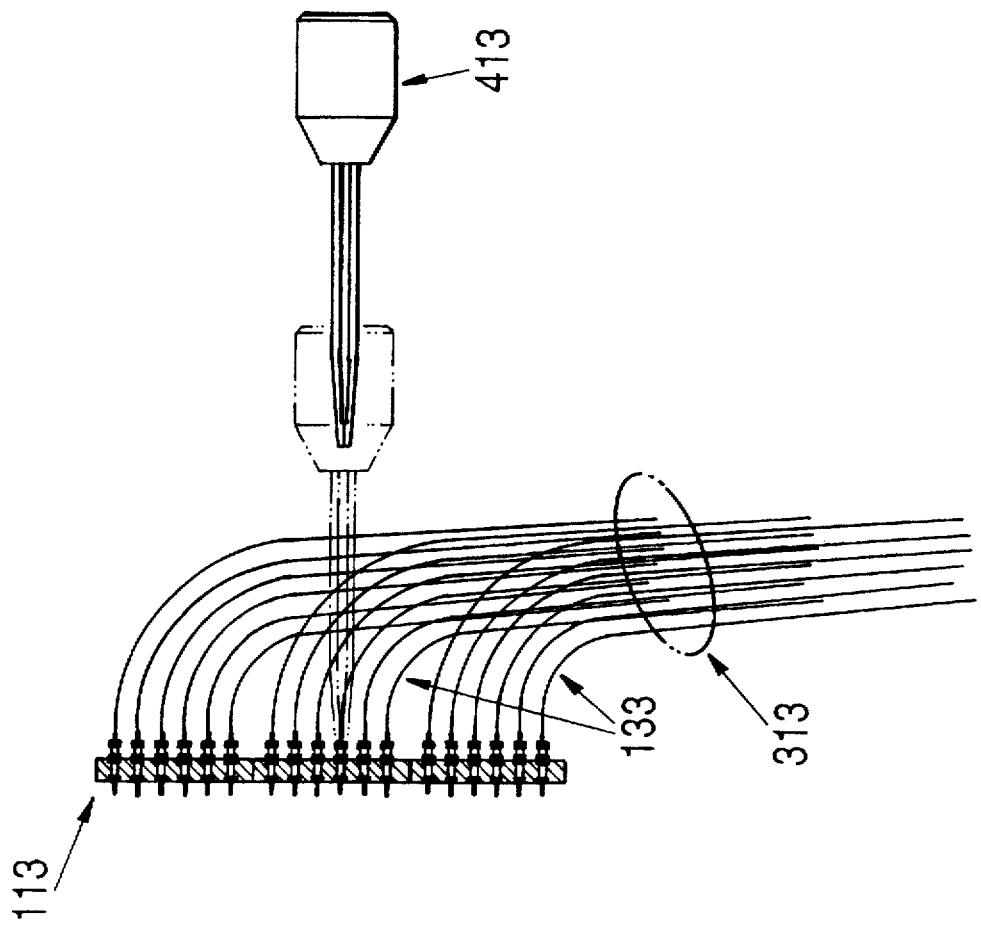

FIGS. 17A and 17B show orbits when finger mechanism 413 moves in the layer of optical fiber group 313, respectively. FIG. 17A shows the case where the hand traveling mechanism of the third preferred embodiment is used, and FIG. 17B shows the case where the straight-type finger traveling mechanism of the first and the second preferred embodiments is used.

As shown in FIG. 17A, in either preferred embodiment shown in FIG. 11 or FIG. 12, finger mechanism 413, moves in the arc along the direction of each optical fiber 133 in optical fiber group 313. Therefore, the finger traveling mechanism 413, which is shown in FIG. 17B, compared with the straight line drive type which is shown in FIG. 17B, can pass more smoothly in optical fiber group 313. Also, in the apparatus shown in FIG. 17A, since finger mechanism 413 moves like an arc, a distance to connection board 113 and the arrangement board, which is needed for pulling-out and inserting, may be shorter, making it possible to make the size of apparatus smaller.

In addition, the technique to provide two finger parts which are the first and the second fingers to the hand robot, which technique is applied in the second preferred embodiment explained above, and the technique that the traveling mechanism of the hand which is applied in the third preferred embodiment is an arc movement type or a link type are also possible to be used with a composition in which a connection board and a arrangement board are horizontally arranged in addition to the composition in which a connection board and a arrangement board are vertically arranged, as explained above.

What is claimed is:

1. An optical fiber cross connection apparatus for connecting and disconnecting first optical fibers to desired second optical fibers, each of said first optical fibers being equipped with a plug on a tip thereof, the apparatus comprising:

an arrangement board installed approximately vertically, and which has a plurality of alignment holes for releasably holding said plugs and for passing said first optical fibers therethrough;

a connection board installed approximately vertically, and on which a plurality of connection means are positioned to which said second optical fibers are connected and to which said plugs of said first optical fibers are connectable;

a handling mechanism for drawing said first optical fibers from the arrangement board so that said first optical fibers are drawn through said alignment holes, and connecting the plugs thereof to desired connection means;

a roll-up mechanism for paying out said first optical fibers when the fibers are drawn through the alignment holes by the handling mechanism; and traveling mechanisms for moving the handling mechanism and the roll-up mechanism to a desired position with respect to the connection board and the arrangement board.

2. The optical fiber cross connection apparatus according to claim 1 which further comprises a fiber rest member on which said first optical fibers lean while said first optical fibers hang from said connection board and said arrangement board.

3. The optical fiber cross connection apparatus according to claim 1 wherein one of the connection board and the arrangement board is divided into at least two portions, and separately arranged on both sides of the other of the arrangement board and the connection board .

4. The optical fiber cross connection apparatus according to claim 2 wherein one of the connection board and the arrangement board is divided into at least two portions, and separately arranged on both sides of the other of the arrangement board and the connection board.

5. The optical fiber cross connection apparatus according to any one of claims 2, 3, or 4, further comprising a partition member provided on said fiber rest member.

6. The optical fiber cross connection apparatus according to any one of claims 2, 3, or 4, wherein, when the plugs thereof are connected to the connection means, lowest points of the first optical fibers connected to the connection board are located below the bottom of at least one of the lowest alignment hole or the bottom of the connection means.

7. The optical fiber cross connection apparatus according to any one of claims 2, 3 or 4, further comprising a partition member disposed on the fiber rest member wherein, when the plugs thereof are connected to the connection means, lowest points of the first optical fibers connected to the connection board are located below the bottom of at least one of the lowest alignment hole or the bottom of the connection means.

8. The optical fiber cross connection apparatus according to claim 1 wherein the handling mechanism has a first plug grip means for drawing said plug from said alignment hole and for inserting the plug into said connection means and a second plug grip means for holding a plug.

9. The optical fiber cross connection apparatus according to claim 8 wherein the handling mechanism has a roll-up means for winding up said first optical fibers.

10. The optical fiber cross connection apparatus according to claim 9, wherein the roll-up means is comprised of a drum which turns with the second plug grip means, wherein the second plug grip means is positioned at the center of rotation of the drum; and further comprising a movement means for moving the first plug grip means of the handling mechanism along the curve formed as a group of optical fibers which are connected to the connection board.

11. An optical fiber cross connection method, with an optical fiber cross connection apparatus for connecting and disconnecting first optical fibers to desired second optical fibers, each of said first optical fibers being equipped with a plug on a tip thereof the apparatus comprising:

an arrangement board installed approximately vertically, and which has a plurality of alignment holes for releasably holding said plugs and for passing said first optical fibers therethrough;

a connection board installed approximately vertically, and on which a plurality of connection means are positioned to which said second optical fibers are connected and to which said plugs of said first optical fibers are connectable;

a handling mechanism which has a first plug grip means for drawing said plug from said alignment hole and for inserting the plug into said connection means and a second plug grip means for holding a plug, for drawing said first optical fibers from the arrangement board so that said first optical fibers are drawn through said alignment holes and for connecting the plugs thereof to desired connection means;

a roll-up mechanism for paying out said first optical fibers when the fibers are drawn through the alignment holes by the handling mechanism; and traveling mechanisms for moving the handling mechanism and the roll-up mechanism to a desired position with respect to the connection board and the arrangement board, the method comprising:

when connecting an objective plug of said plugs to an objective connection means of said connection means after disconnecting the other plug which has been already connected to the objective connection means, a step of disconnecting the plug from the objective connection means while the second plug grip means of the handling mechanism holds the objective plug which has been disconnected from one of the connection means; and a step of connecting the objective plug to the objective connection means.

12. An optical fiber cross connection method according to claim 11, wherein the handling mechanism further comprises a roll-up means for winding up said optical fiber, comprising the additional step of winding up, by the roll-up means of the handling mechanism, said optical fibers while the second plug grip means of the handling mechanism holds the objective plug which has been disconnected from one of the connection means.

13. An optical fiber cross connection method, with an optical fiber cross connection apparatus for connecting and disconnecting first optical fibers to desired second optical fibers, each of said first optical fibers being equipped with a plug on a tip thereof, the apparatus comprising:

an arrangement board installed approximately vertically, and which has a plurality of alignment holes for releasably holding said plugs and for passing said first optical fibers therethrough;

a connection board installed approximately vertically, and on which a plurality of connection means are positioned to which said second optical fibers are connected and to which said plugs of said first optical fibers are connectable;

a handling mechanism having a first plug grip means for drawing said plug from said alignment hole and for inserting the plug into said connection means, a second plug grip means for holding a plug, and a roll-up means for winding up said optical fiber, the roll-up means comprising a drum which turns with the second plug grip means, wherein the second plug grip means is positioned at the center of rotation of the drum, for drawing said first optical fibers from the arrangement board so that said first optical fibers are drawn through said alignment holes and for connecting the plugs thereof to desired connection means;

a movement means for moving the first plug grip means of the handling mechanism along the curve formed as a group of optical fibers which are connected to the connection board;

a roll-up mechanism for paying out said first optical fibers when the fibers are drawn through the alignment holes by the handling mechanism; and traveling mechanisms for moving the handling mechanism and the roll-up mechanism to a desired position with respect to the connection board and the arrangement board, the method comprising:

a step of moving the first plug grip means along the direction of the group of optical fibers which are connected to the connection board; and a step of winding up the optical fibers by tuning the drum while transferring the plug which is held by the first plug grip means to the second plug grip means.

14. The optical fiber cross connection method according to claim 13, comprising the additional step of reversing, by the second plug grip means, the direction of the plug which the first plug grip means holds.

* * * * *

UNITED STATES PATENT AND TRADEMARK OFFICE
CERTIFICATE OF CORRECTION

PATENT NO. : 5,784,515
DATED : July 21, 1998
INVENTOR(S) : Naoyuki TAMARU et al.

It is certified that error appears in the above-identified patent and that said Letters Patent is hereby corrected as shown below:

Claim 3, column 13, line 51, "board ." should read --board.--

Claim 11, column 14, line 27, after "thereof", insert --,--.

Claim 13, column 16, line 21, "tuning" should read --turning--.

Signed and Sealed this

Twenty-first Day of September, 1999

Attest:

Q. TODD DICKINSON

*Attesting Officer*    Acting Commissioner of Patents and Trademarks